(12) United States Patent
Zhao et al.

(10) Patent No.: US 11,447,915 B2
(45) Date of Patent: *Sep. 20, 2022

(54) PULP, SLURRY, SHEET, LAMINATE, AND METHOD FOR PRODUCING PULP

(71) Applicant: OJI HOLDINGS CORPORATION, Tokyo (JP)

(72) Inventors: Mengchen Zhao, Chiba (JP); Yuichi Noguchi, Tokyo (JP); Ikue Homma, Tokyo (JP); Yusuke Todoroki, Chiba (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 431 days.

This patent is subject to a terminal disclaimer.

(21) Appl. No.: 16/338,255

(22) PCT Filed: Sep. 29, 2017

(86) PCT No.: PCT/JP2017/035525
§ 371 (c)(1),
(2) Date: Mar. 29, 2019

(87) PCT Pub. No.: WO2018/062502
PCT Pub. Date: Apr. 5, 2018

(65) Prior Publication Data
US 2020/0032455 A1 Jan. 30, 2020

(30) Foreign Application Priority Data
Sep. 30, 2016 (JP) .............................. JP2016-193393

(51) Int. Cl.
*D21H 11/20* (2006.01)
*D21C 9/10* (2006.01)
(Continued)

(52) U.S. Cl.
CPC ............. *D21H 11/20* (2013.01); *D21C 9/005* (2013.01); *D21C 9/10* (2013.01); *D21H 11/18* (2013.01)

(58) Field of Classification Search
CPC ................................ D21H 11/20; D21H 11/18
See application file for complete search history.

(56) References Cited

U.S. PATENT DOCUMENTS

| | | | |
|---|---|---|---|
| 2007/0246176 A1 | 10/2007 | Miyawaki et al. | |
| 2011/0126995 A1* | 6/2011 | Turunen | D21H 17/14 162/162 |

(Continued)

FOREIGN PATENT DOCUMENTS

| | | |
|---|---|---|
| CN | 105209686 A | 12/2015 |
| EP | 2 998 435 A1 | 3/2016 |

(Continued)

OTHER PUBLICATIONS

Illy et al., Phosphorylation of bio-based compounds: the state of the art, Jul. 2015, Polym. Chem, 6, p. 6257-6291. (Year: 2015).*

(Continued)

*Primary Examiner* — Anthony Calandra
(74) *Attorney, Agent, or Firm* — Sughrue Mion, PLLC

(57) ABSTRACT

It is an object of the present invention to optimize a bleaching process in a step of producing phosphorylated cellulose fibers. The present invention relates to a pulp comprising cellulose fibers having 0.5 mmol/g or more of phosphoric acid groups or phosphoric acid group-derived substituents, wherein when the pulp is processed into a sheet and four sheets are laminated on one another, the ISO whiteness of the laminate is 82% or more. Moreover, when the pulp of the present invention is processed into a sheet (Continued)

and four sheets are then laminated on one another, the b* value of the obtained laminate according to the L*a*b* color system is 5.5 or less.

2 Claims, 1 Drawing Sheet

(51) Int. Cl.
  D21H 11/18  (2006.01)
  D21C 9/00  (2006.01)

(56) References Cited

U.S. PATENT DOCUMENTS

| | | | |
|---|---|---|---|
| 2016/0273165 A1* | 9/2016 | Laine | D21H 21/18 |
| 2017/0183820 A1* | 6/2017 | Banzashi | D21C 9/002 |
| 2019/0024317 A1* | 1/2019 | Fujii | D21H 11/20 |

FOREIGN PATENT DOCUMENTS

| | | | | |
|---|---|---|---|---|
| EP | 3 333 316 A1 | 6/2018 | | |
| EP | 3 351 374 A1 | 7/2018 | | |
| JP | 2005-68630 A | 3/2005 | | |
| JP | 2009-108430 A | 5/2009 | | |
| JP | 2013-107927 A | 6/2013 | | |
| JP | 2013127141 A * | 6/2013 | | C08B 5/00 |
| JP | 2014-125691 A | 7/2014 | | |
| JP | 2016-125153 A | 7/2016 | | |
| KR | 10-2016-0008607 A | 1/2016 | | |
| KR | 10-2016-0064627 A | 6/2016 | | |
| WO | 2013/073652 A1 | 5/2013 | | |
| WO | 2014/185505 A1 | 11/2014 | | |
| WO | 2015/182438 A1 | 12/2015 | | |

OTHER PUBLICATIONS

Banzashi Go, Complete nanofibrillation of cellulose prepared by phosphoric acid esterification, Jun. 2016, TAPPI Nano. (Year: 2016).*

UPM Northern Softwood Kraft Pulp Kaukas Mill spec sheet (Year: 2019).*

Office Action dated Mar. 3, 2021, issued by the State Intellectual Property Office of the P.R.C. in Chinese application No. 201780060923.8.

International Preliminary Report on Patentability with a Translation of Written Opinion in International Application No. PCT/JP2017/035525, dated Apr. 2, 2019.

International Search Report in International Application No. PCT/JP2017/035525, dated Dec. 12, 2017.

Written Opinion in International Application No. PCT/JP2017/035525, dated Dec. 12, 2017.

Extended European Search Report dated Mar. 12, 2020, from the European Patent Office in corresponding European application No. 17856451.4.

Office Action dated Oct. 30, 2020 in Taiwanese Application No. 106133722.

Office Action dated Jan. 25, 2021, issued by the Korean Intellectual Property Office in Korean application No. 10-2019-7010826.

Office Action dated May 19, 2020, from the Korean Patent Office in Korean Application No. 10-2019-7010826.

Office Action dated Jul. 15, 2020, from the European Patent Office in European Application No. 17856451.4.

Notice of Reasons for Refusal dated Jul. 20, 2021 issued by the Japanese Patent Office in Japanese Application No. 2018-542943.

Communication dated Jul. 20, 2021 issued by the Korean Patent Office in Korean Application No. 10-2019-7010826.

Communication dated Aug. 20, 2021 from the China National Intellectual Property Administration in Chinese Application No. 201780060923.8.

Office Action dated Nov. 11, 2021 from the China National Intellectual Property Administration in CN Application No. 201780060923.8.

Office Action dated Mar. 14, 2022 from China National Intellectual Property Administration in Chinese Application No. 201780060923.8.

Office Action dated May 17, 2022 by China National Intellectual Property Administration in Chinese Application No. 201780060923.8.

* cited by examiner

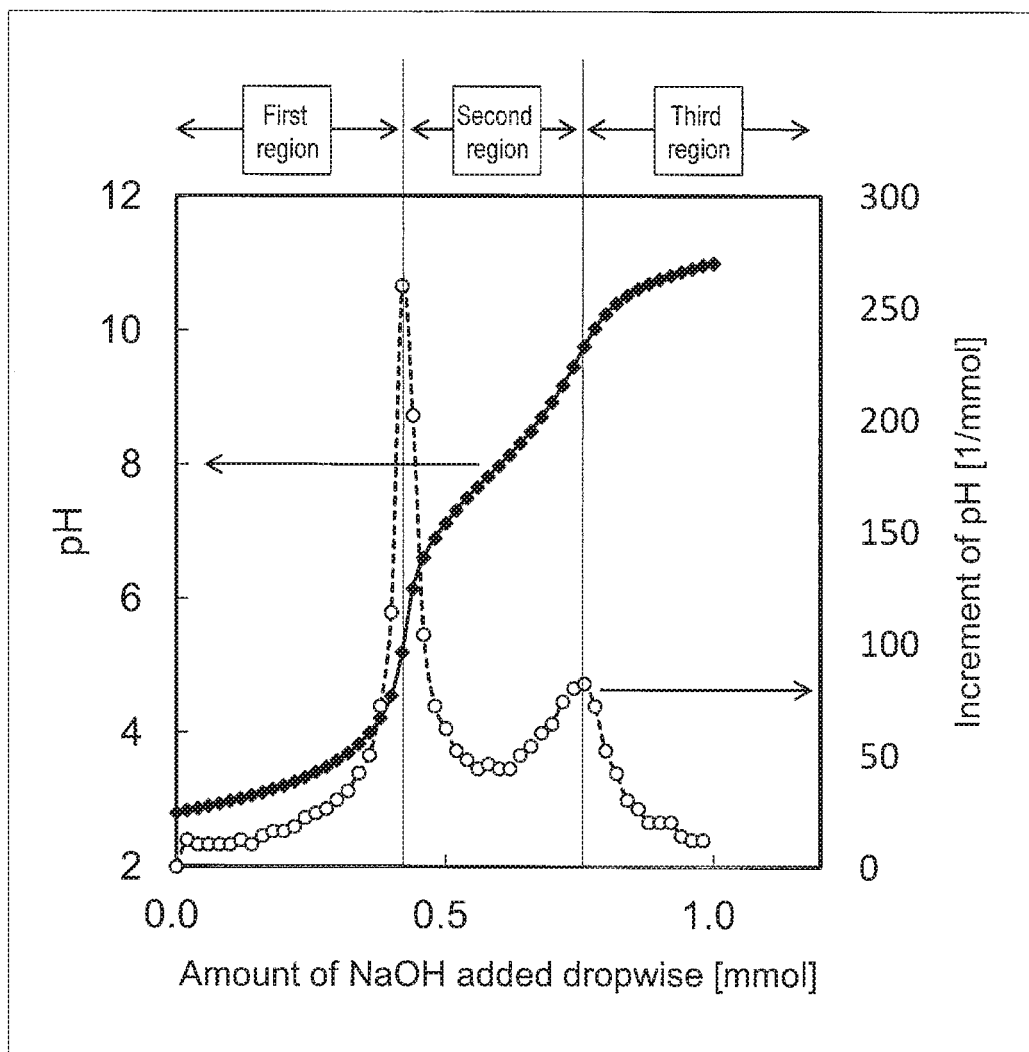

US 11,447,915 B2

PULP, SLURRY, SHEET, LAMINATE, AND METHOD FOR PRODUCING PULP

CROSS REFERENCE TO RELATED APPLICATIONS

This application is a National Stage of International Application No. PCT/JP2017/035525 filed Sep. 29, 2017, claiming priority based on Japanese Patent Application No. 2016-193393 filed Sep. 30, 2016.

TECHNICAL FIELD

The present invention relates to a pulp, a slurry, a sheet, a laminate, and a method for producing a pulp. Specifically, the present invention relates to pulp having high whiteness, slurry having low yellowness when it is formed in a sheet, a sheet having low yellowness, and a laminate having the aforementioned sheet, and a method for producing the aforementioned pulp.

BACKGROUND ART

Conventionally, cellulose fibers have been broadly utilized in clothes, absorbent articles, paper products, and the like. As cellulose fibers, ultrafine cellulose fibers having a fiber diameter of 1 μm or less have been known, as well as cellulose fibers having a fiber diameter of 10 μm or more and 50 μm or less.

Cellulose fibers are obtained by subjecting a wood or non-wood material to a digestion treatment. There is a case where a bleaching step is established after the digestion treatment step, and by performing such a bleaching step, cellulose fibers having high whiteness are obtained. Moreover, by establishing such a bleaching step, deinked pulp (reproduced cellulose fibers) can be obtained from a printed waste paper.

Patent Document 1 discloses a method for producing a deinked pulp, comprising a step of bleaching a printed waste paper. In this method, hydrogen peroxide, hydrosulfite, thiourea dioxide, sodium thiosulfate and the like are used as bleaching drugs for reproducing the printed waste paper. Studies are conducted to obtain a deinked pulp having high whiteness by adjusting bleaching conditions, as appropriate. Patent Document 2 discloses a method for producing a cellulose pulp, comprising a bleaching step in which chlorine dioxide and a bleaching aid are used.

PRIOR ART DOCUMENTS

Patent Documents

Patent Document 1: JP-A-2016-125153
Patent Document 2: JP-A-2009-108430

SUMMARY OF INVENTION

Object to be Solved by the Invention

By the way, studies have been conducted to control the physical properties of cellulose fibers by introducing ionic substituents such as phosphoric acid groups into the cellulose fibers. Moreover, studies have also been conducted to obtain ultrafine cellulose fibers by using cellulose fibers having ionic substituents such as phosphoric acid groups. However, there has been a case where cellulose fibers having phosphoric acid groups have insufficient whiteness, and therefore, it has been desired to improve the whiteness of the cellulose fibers having phosphoric acid groups.

In order to solve the above-described problem, the present invention aims to optimize a bleaching process in a step of producing cellulose fibers having phosphoric acid groups, so as to provide a pulp comprising cellulose fibers having high whiteness. Further, it is another object of the present invention to provide a slurry capable of realizing a sheet with low yellowness, a sheet with low yellowness, and a laminate having the same.

Means for Solving the Object

The present inventors have found that, by optimizing a bleaching process in a step of producing phosphorylated cellulose fibers, the whiteness of a pulp comprising cellulose fibers can be enhanced, even though the amount of phosphoric acid groups introduced is large in the pulp comprising cellulose fibers.

Specifically, the present invention has the following configurations.

[1] A pulp comprising cellulose fibers having 0.5 mmol/g or more of phosphoric acid groups or phosphoric acid group-derived substituents, wherein when the pulp is processed into a sheet under the following condition A and four sheets are then laminated on one another, the ISO whiteness of the obtained laminate measured in accordance with JIS P 8148, with the exception that the test piece defined by JIS P 8148 is set to be the obtained laminate, is 82% or more:

(Condition A)

ion exchange water is added to the pulp to prepare a suspension in which the concentration of the pulp comprising phosphorylated cellulose fibers is 0.3% by mass, and then, a wet sheet having an absolute dry basis weight of 200 g/m$^2$ is formed from the suspension; the wet sheet is peeled off from a filter, is then placed on a stainless steel tray, and is then dried under conditions of 23° C. and a relative humidity of 50% for 3 days; and both surfaces of the dried sheet are sandwiched by papers and metal plates, and the sheet is then pressed by a pressure of 7.7 MPa for 1 minute to obtain a pulp sheet.

[2] The pulp according to [1], wherein when the pulp is processed into a sheet under the condition A and four sheets are then laminated on one another, the b* value of the obtained laminate according to the L*a*b* color system is 5.5 or less.

[3] The pulp according to [1] or [2], wherein when a fibrillation treatment and a centrifugation treatment are carried out under the following condition a, a supernatant yield calculated according to the following Equation b is 50% or more:

(Condition a)

the pulp is diluted with ion exchange water to a concentration of 0.5% by mass to obtain a slurry, and the slurry is then subjected to a fibrillation treatment using CLEARMIX-2.2S manufactured by M Technique Co., Ltd., at a rotation number of 21500 rpm for 30 minutes; and thereafter, the obtained slurry is diluted with ion exchange water to a solid concentration of 0.1% by mass, and the resulting slurry is then subjected to a centrifugation treatment at 12000 G for 10 minutes, Supernatant yield (%)=solid concentration (% by mass) in supernatant obtained after centrifugation treatment/solid concentration (% by mass) in slurry before centrifugation treatment×100.  (Equation b)

[4] A slurry comprising phosphorylated ultrafine cellulose fibers, which have 0.5 mmol/g or more of phosphoric acid groups or phosphoric acid group-derived substituents and have a fiber width of 1000 nm or less, wherein when a sheet is formed using the slurry under the following condition c, the yellowness ($YI_{30}$) of the sheet relative to a film thickness of 30 μm calculated according to the following Equation d is 0.57 or less:
(Condition c)

the concentration of the phosphorylated ultrafine cellulose fibers in the slurry is adjusted to be 0.5% by mass, and the slurry is then dehydrated by suction filtration using, as a filter medium, a PVDF membrane filter having a pore diameter of 650 nm, until the solid content in the phosphorylated ultrafine cellulose fibers becomes 4% by mass or more; and thereafter, the resulting slurry is subjected to drying under tension for 2 days in a humidity conditioning chamber at 23° C. and a relative humidity of 50%, so as to obtain a sheet having an absolute dry basis weight of 40 g/m$^2$, Yellowness ($YI_{30}$) of sheet relative to film thickness of 30 μm=yellowness ($YI$) of sheet×(30 (μm))/ (film thickness of sheet (μm)), (Equation d)

wherein, in the above equation, the yellowness (YI) of a sheet is measured in accordance with JIS K 7373.

[5] A sheet comprising phosphorylated ultrafine cellulose fibers, which have 0.5 mmol/g or more of phosphoric acid groups or phosphoric acid group-derived substituents and have a fiber width of 1000 nm or less, wherein $YI_{30}$ calculated according to the following Equation d is 0.57 or less:

Yellowness ($YI_{30}$) of sheet relative to film thickness of 30 μm=yellowness ($YI$) of sheet×(30 (μm))/ (film thickness of sheet (μm)), (Equation d)

wherein, in the above equation, the yellowness (YI) of a sheet is measured in accordance with JIS K 7373

[6] A laminate having the sheet according to [5] and a resin layer disposed on at least one surface of the sheet.

[7] A method for producing a pulp, comprising bleaching a pulp comprising cellulose fibers having 0.5 mmol/g or more of phosphoric acid groups or phosphoric acid group-derived substituents.

[8] The method for producing a pulp according to [7], wherein a different between the amount of phosphoric acid groups in cellulose fibers before the bleaching and the amount of phosphoric acid groups in cellulose fibers after the bleaching is 0.2 mmol/g or less.

[9] The method for producing a pulp according to [7] or [8], wherein a difference between the viscosity average polymerization degree of ultrafine cellulose fibers obtained by subjecting a pulp comprising cellulose fibers before the bleaching to a fibrillation treatment performed under the following condition e, and the viscosity average polymerization degree of ultrafine cellulose fibers obtained by subjecting a pulp comprising cellulose fibers after the bleaching to a fibrillation treatment performed under the following condition e, is 100 or less:
(Condition e)

a pulp comprising cellulose fibers is diluted with ion exchange water to a concentration of 0.5% by mass, so as to obtain a slurry, and the slurry is then subjected to a fibrillation treatment using CLEARMIX-2.2S manufactured by M Technique Co., Ltd., at a rotation number of 21500 rpm for 30 minutes.

The method for producing a pulp according to any one of [7] to [9], wherein when a pulp comprising cellulose fibers before the bleaching is subjected to a fibrillation treatment performed under the following condition e so as to obtain an ultrafine cellulose fiber-containing slurry 1 having a concentration of 0.4% by mass, the viscosity of the slurry 1 is defined as P, and also, when a pulp comprising cellulose fibers after the bleaching is subjected to a fibrillation treatment performed under the following condition e so as to obtain an ultrafine cellulose fiber-containing slurry 2 having a concentration of 0.4% by mass, the viscosity of the slurry 2 is defined as Q, and the P/Q value is 0.5 or more and 2.0 or less:
(Condition e)

the pulp is diluted with ion exchange water to a concentration of 0.5% by mass, so as to obtain a slurry, and the slurry is then subjected to a fibrillation treatment using CLEARMIX-2.2S manufactured by M Technique Co., Ltd., at a rotation number of 21500 rpm for 30 minutes.

Advantageous Effects of Invention

In the present invention, a bleaching process has been successfully optimized in a step of producing phosphorylated cellulose fibers. According to the present invention, a pulp comprising cellulose fibers, in which the amount of phosphoric acid groups introduced is large and which have sufficiently high whiteness, can be obtained. According to the present invention, a slurry capable of realizing a sheet with low yellowness, a sheet with low yellowness, and a laminate having the same are further provided.

BRIEF DESCRIPTION OF DRAWINGS

FIG. 1 is a graph showing the relationship between the amount of NaOH added dropwise to a fiber raw material and the pH.

EMBODIMENTS OF CARRYING OUT THE INVENTION

Hereinafter, the present invention will be described in detail. The below-mentioned constituent features will be explained based on representative embodiments or specific examples in some cases. However, the present invention is not limited to such embodiments.
(Pulp)

The present invention relates to a pulp comprising cellulose fibers having 0.5 mmol/g or more of phosphoric acid groups or phosphoric acid group-derived substituents, wherein when the pulp is processed into a sheet under the following condition A and four sheets are then laminated on one another, the ISO whiteness of the obtained laminate measured in accordance with JIS P 8148, with the exception that the test piece defined by JIS P 8148 is set to be the obtained laminate, is 82% or more.
(Condition A)

Ion exchange water is added to the pulp to prepare a suspension in which the concentration of the pulp comprising phosphorylated cellulose fibers is 0.3% by mass, and then, a wet sheet having an absolute dry basis weight of 200 g/m$^2$ is formed from the suspension. The wet sheet is peeled off from a filter, is then placed on a stainless steel tray, and is then dried under conditions of 23° C. and a relative humidity of 50% for 3 days. Both surfaces of the dried sheet are sandwiched by papers and metal plates, and the sheet is then pressed by a pressure of 7.7 MPa for 1 minute to obtain a pulp sheet.

In the present invention, a pulp comprising cellulose fibers, into which large quantities of phosphoric acid groups are introduced, and which has sufficiently high whiteness, can be obtained. Moreover, in the present invention, such a pulp having high whiteness is fibrillated, so that ultrafine cellulose fibers capable of exhibiting desired physical properties can be obtained.

In a phosphorylation step of introducing phosphoric acid groups into cellulose fibers, color developed in the cellulose fibers should be improved. In particular, when many phosphoric acid groups are introduced into the cellulose fibers, such coloration tends to be increased, and thus, the improvement thereof is desired. Herein, in order to reduce coloration in the phosphorylated cellulose fibers, bleaching of a pulp comprising phosphorylated cellulose fibers is considered. However, upon bleaching the pulp comprising cellulose fibers, there is a case where cellulose fibers themselves are hydrolyzed, or the physical properties thereof are changed. That is to say, by establishing a bleaching step, cellulose fibers may be damaged, and as a result, there is a concern that the physical properties of the damaged cellulose fibers or a pulp comprising the damaged cellulose fibers would be greatly changed. For example, when a pulp comprising phosphorylated cellulose fibers is fibrillated, a resulting ultrafine cellulose fiber-containing slurry exhibits high transparency and high viscosity. However, in the case of using a pulp comprising phosphorylated cellulose fibers obtained after a bleaching step, there is a concern that fibrillation does not favorably progress because the phosphorylated cellulose fibers are damaged, and thus that the transparency and viscosity of the obtained ultrafine cellulose fiber-containing slurry are decreased. That is, it has been considered that the fibrillation of a pulp comprising phosphorylated cellulose fibers would be prevented by giving damage to the cellulose fibers.

In general, a pulp comprising phosphorylated cellulose fibers is obtained by phosphorylating a raw material pulp before introduction of phosphoric acid groups. Such a raw material pulp is obtained by digesting chipped wood materials such as hard wood or soft wood, or chipped non-wood materials such as herbaceous plants, with a digestion liquid consisting of caustic soda or sodium sulfide, and then performing a bleaching treatment on the resulting materials. As such a raw material pulp, a pulp, from which coloration-causing substances such as lignin have been removed, is generally used. Thus, the obtained raw material pulp is mixed with a phosphorylating agent, and the mixture is then subjected to a heat treatment, etc., to obtain a pulp comprising phosphorylated cellulose fibers. In the phosphorylation step, for the purpose of efficiently performing phosphorylation, a heat treatment is carried out. However, as a result of the studies conducted by the present inventors, it has been found that the obtained pulp comprising phosphorylated cellulose fibers is turned yellow due to the influence of the heat treatment and the phosphorylating agent. In addition, it is also concerned that lignin remaining in the digestion step would cause coloration in the subsequent phosphorylation step.

When the amount of phosphoric acid groups introduced into cellulose fibers intends to be increased, the phosphorylation step may be carried out multiple times, or a heating time may be prolonged. Hence, a pulp comprising cellulose fibers, into which large quantities of phosphoric acid groups are introduced, is problematic in that whiteness is easily decreased (deteriorated).

Moreover, in steps performed after large quantities of phosphoric acid groups have been introduced into cellulose fibers, chemical treatments other than a pH adjustment step are not generally carried out. This is because the amount of the introduced phosphoric acid groups and the polymerization degree of cellulose fibers are retained. As such, if a bleaching treatment has been performed once upon obtaining a raw material pulp, in general, a bleaching treatment step is not established again after completion of the phosphorylation treatment step. That is to say, when a pulp comprising phosphorylated cellulose fibers having high whiteness intends to be produced, no dominant means have been found other than searching conditions for reducing coloration to the minimum in the phosphorylation step.

In the present invention, a bleaching treatment is purposely performed after completion of the phosphorylation treatment step. In the present invention, it has been found that, even in a case where a bleaching step is established after the phosphorylation treatment step, the amount of the introduced phosphoric acid groups can be maintained at a high level. Moreover, in the present invention, by establishing a bleaching step after the phosphorylation treatment step, a pulp comprising phosphorylated cellulose fibers having high whiteness can be obtained. In the present invention, it has been found that the physical properties or characteristics of the thus obtained pulp comprising phosphorylated cellulose fibers having high whiteness are not damaged by the bleaching step. Specifically, even in a case where a bleaching step is established after the phosphorylation treatment step, a pulp comprising phosphorylated cellulose fibers can be favorably fibrillated, and a slurry containing ultrafine cellulose fibers obtained by fibrillation can exhibit desired physical properties. For example, a slurry containing ultrafine cellulose fibers has high transparency and can exhibit high viscosity.

In the present invention, by performing a bleaching treatment using a suitable amount of bleaching agent under suitable bleaching conditions, a reduction in the amount of phosphoric acid groups contained in phosphorylated cellulose fibers and the polymerization degree thereof can be suppressed. In the present invention, while the object of the present invention that is the improvement of whiteness is achieved, the type and amount of a bleaching agent and the temperature applied during the bleaching treatment, which do not cause a reduction in the amount of phosphoric acid groups contained in phosphorylated cellulose fibers and the polymerization degree thereof, have been found based on the aforementioned findings.

As mentioned above, in the present invention, a method for producing a pulp comprising cellulose fibers having high whiteness, into which large quantities of phosphoric acid groups are introduced, has been found. Moreover, the pulp comprising phosphorylated cellulose fibers having high whiteness of the present invention is not prevented from being fibrillated. Thus, the pulp comprising phosphorylated cellulose fibers having high whiteness of the present invention provides a highly transparent slurry after it has been fibrillated, and the slurry exhibits high viscosity, as with a pulp comprising cellulose fibers, which are not subjected to a bleaching step after completion of the phosphorylation step.

The content of the phosphoric acid groups or phosphoric acid group-derived substituents (hereinafter simply referred to as "phosphoric acid groups" at times) comprised in the cellulose fibers may be 0.5 mmol/g or more per gram (mass) of the cellulose fibers, and it is more preferably 1.00 mmol/g or more, and further preferably 1.10 mmol/g or more, per gram (mass) of the cellulose fibers. On the other hand, the content of the phosphoric acid groups is preferably 3.65 mmol/g or less, more preferably 3.5 mmol/g or less, and further preferably 3.0 mmol/g or less. Besides, in the present description, the content of the phosphoric acid groups in the cellulose fibers is equal to the amount of strongly acidic groups of phosphoric acid groups in the cellulose fibers, as described later. In the present invention, it is preferable that the content of the phosphoric acid groups in a pulp comprising cellulose fibers be also within the above-described range.

The content of the phosphoric acid groups in the cellulose fibers can be measured by a neutralization titration method. Upon the measurement by such a neutralization titration method, phosphoric acid groups are completely converted to acid type groups, and fibrillation is then performed by a mechanical treatment step (fibrillation step). Thereafter, while a sodium hydroxide aqueous solution is added to the obtained ultrafine cellulose fiber-containing slurry, changes in the pH are obtained, so that the amount of phosphoric acid groups introduced can be measured.

Conversion of the phosphoric acid groups to acid type groups is carried out by diluting the obtained phosphorylated cellulose fibers with ion exchange water, so that the concentration of cellulose fibers becomes 2% by mass, and then gradually adding a sufficient amount of 1 N hydrochloric acid aqueous solution to the resulting phosphorylated cellulose fibers, while stirring. In such conversion of the phosphoric acid groups to acid type groups, it is preferable to repeat the operation of dehydrating the above-described cellulose fiber-containing slurry to obtain a dehydrated sheet, then diluting the dehydrated sheet with ion exchange water again, and then adding a 1 N hydrochloric acid aqueous solution to the resultant, so that the phosphoric acid groups contained in the cellulose fibers can be completely converted to acid type groups. Then, after completion of the step of converting the phosphoric acid groups to acid type groups, it is preferable to repeat the operation of stirring the obtained cellulose fiber-containing slurry to uniformly disperse it, followed by filtration and dehydration to obtain a dehydrated sheet, so that redundant hydrochloric acid can be fully washed away.

In the mechanical treatment step (fibrillation step), ion exchange water is poured onto the obtained dehydrated sheet to obtain a cellulose fiber-containing slurry, in which the concentration of cellulose fibers is 0.3% by mass, and this slurry is then treated using a defibration treatment device (manufactured by M Technique Co., Ltd., CLEARMIX-2.2S) under conditions of 21500 rpm for 30 minutes. Thus, an ultrafine cellulose fiber-containing slurry is obtained.

In the titration using alkali, changes in the pH values indicated by the dispersion are measured while adding a 0.1 N sodium hydroxide aqueous solution to the ultrafine cellulose fiber-containing slurry. In this neutralization titration, in a curve obtained by plotting pH values measured with respect to the amount of alkali (sodium hydroxide aqueous solution) added, two points, in which the increment (the derivative of pH to the amount of alkali added dropwise) becomes maximum, are obtained (i.e., a point in which the increment becomes maximum, and a point in which the increment becomes second maximum). Among these, the amount of alkali required until the maximum point of the increment obtained first after addition of alkali (hereinafter referred to as a "first end point") is equal to the amount of strongly acidic groups in the dispersion used in the titration, and the amount of alkali required until the maximum point of the increment obtained second after addition of alkali (hereinafter referred to as a "second end point") is equal to the amount of weakly acidic groups in the dispersion used in the titration. The alkali amount (mmol) required until the first end point is divided by the solid content (g) in the ultrafine cellulose fiber-containing slurry to be titrated, to obtain a first dissociated alkali amount (mmol/g). This amount is defined to be the content of the phosphoric acid groups in the cellulose fibers.

FIG. 1 shows a curve obtained by plotting the pH values measured with respect to the amount of alkali (sodium hydroxide aqueous solution) in neutralization titration. The region up to the first end point is referred to as a first region, and the region up to the second end point is referred to as a second region. Besides, after the second region, there is a third region. In short, three regions appear. In FIG. 1, the amount of the alkali required for the first region is equal to the amount of strongly acidic groups in the slurry used in the titration, and the amount of the alkali required for the second region is equal to the amount of weakly acidic groups in the slurry used in the titration.

The pulp comprising cellulose fibers of the present invention is processed into a sheet under the aforementioned condition A and four sheets are then laminated on one another, the ISO whiteness of the obtained laminate measured in accordance with JIS P 8148, with the exception that the test piece defined by JIS P 8148 is set to be the obtained laminate, is 82% or more, preferably 83% or more, and more preferably 84% or more. In addition, the ISO whiteness of the sheets may also be 100%. As an apparatus for measuring ISO whiteness, a whiteness spectrophotometer (manufactured by Suga Test Instruments Co., Ltd., SC-10WN) can be used.

In the present invention, four sheets formed under the following condition A are laminated on one another, and the ISO whiteness thereof is then measured.

(Condition A)

Ion exchange water is added to the pulp to prepare a suspension in which the concentration of the pulp comprising phosphorylated cellulose fibers is 0.3% by mass, and then, a wet sheet having an absolute dry basis weight of 200 g/m$^2$ is formed from the suspension. The wet sheet is peeled off from a filter, is then placed on a stainless steel tray, and is then dried under conditions of 23° C. and a relative humidity of 50% for 3 days. Both surfaces of the dried sheet are sandwiched by papers and metal plates, and the sheet is then pressed by a pressure of 7.7 MPa for 1 minute to obtain a pulp sheet. Besides, the dried sheet can be pressed, for example, using a mini-hot press (manufactured by Toyo Seiki Kogyo Co., Ltd., MP-SNH).

The pulp comprising cellulose fibers of the present invention is processed into a sheet under the above-described condition A and four sheets are then laminated on one another. The b* value of the obtained laminate according to the L*a*b* color system is preferably 5.5 or less, more preferably 5.0 or less, further preferably 4.6 or less, and particularly preferably 4.0 or less. The b* value can be measured by the same method as that for measuring the aforementioned ISO whiteness. When the pulp comprising cellulose fibers of the present invention is processed into a sheet and four sheets are then laminated on one another, the b* value of the laminate is within the above-described range, and therefore, exhibition of yellow color is suppressed. Thereby, the whiteness of the sheet is enhanced.

In the pulp comprising cellulose fibers of the present invention, even in a case where a bleaching step is established after completion of the phosphorylation step, damage on the cellulose fibers is suppressed. Hence, the cellulose fibers can be fibrillated, as with cellulose fibers that are not subjected to a bleaching step after completion of the phosphorylation step. That is to say, when the pulp comprising cellulose fibers of the present invention is fibrillated, the yield of ultrafine cellulose fibers is high. Specifically, when a fibrillation treatment and a centrifugation treatment are carried out under the following condition a, the supernatant yield calculated according to the following Equation b is preferably 50% or more. The supernatant yield is more preferably 70% or more, even more preferably 80% or more, further preferably 90% or more, and particularly preferably 95% or more.

(Condition a)

The pulp is diluted with ion exchange water to a concentration of 0.5% by mass to obtain a slurry, and the slurry is then subjected to a fibrillation treatment using CLEARMIX-2.2S manufactured by M Technique Co., Ltd., at a rotation number of 21500 rpm for 30 minutes. Thereafter, the obtained slurry is diluted with ion exchange water to a solid concentration of 0.1% by mass, and the resulting slurry is then subjected to a centrifugation treatment at 12000 G for 10 minutes.

Supernatant yield (%)=solid concentration (% by mass) in supernatant obtained after centrifugation treatment/solid concentration (% by mass) in slurry before centrifugation treatment×100.   (Equation b)

Besides, in the present invention, the fiber width of a cellulose fiber is not particularly limited. The fiber width of a cellulose fiber may be greater than 1000 nm, or may also be 1000 nm or less. Moreover, cellulose fibers having a fiber width of greater than 1000 nm may be present together with cellulose fibers having a fiber width of 1000 nm or less. In the present description, when the fiber width of a cellulose fiber is 1000 nm or less, such a cellulose fiber is referred to as an "ultrafine cellulose fiber."

Herein, the fiber width of a cellulose fiber can be measured by electron microscopic observation according to the following method. First, an aqueous suspension of cellulose fibers having a concentration of 0.05% by mass or more and 0.1% by mass or less is prepared, and the suspension is casted onto a hydrophilized carbon film-coated grid as a sample for TEM observation. At this time, SEM images of the surface of the suspension casted onto glass may be observed. The sample is observed using electron microscope images taken at a magnification of 1000×, 5000×, 10000×, or 50000×, depending on the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. Three or more sets of images of surface portions, which are at least not overlapped, are thus observed, and the widths of the fibers intersecting the straight line X and the straight line Y are read in the each image. At least 120 fiber widths (20 fibers×2×3=120) are thus read.

The average fiber length of cellulose fibers is not particularly limited, but it is preferably 0.1 μm or more, more preferably 1 μm or more, even more preferably 0.1 mm or more, and further preferably 0.6 mm or more. On the other hand, it is preferably 5 mm or less, and more preferably 2 mm or less. Herein, the average fiber length of cellulose fibers can be obtained, for example, by using Kajaani Fiber Size Analyzer (FS-200) manufactured by Kajaani Automation to measure the length weighted average fiber length. Otherwise, the average fiber length of cellulose fibers may also be measured by using a scanning electron microscope (SEM), a transmission electron microscope (TEM), etc., depending on the length of the fiber.

When the cellulose fibers are ultrafine cellulose fibers, the ultrafine cellulose fibers preferably have a type I crystal structure. In this regard, the fact that ultrafine cellulose fibers have a type I crystal structure may be identified by a diffraction profile obtained from a wide angle X-ray diffraction photograph using CuKα (λ=1.5418 Å) monochromatized with graphite. Specifically, it may be identified based on the fact that there are typical peaks at two positions near 2θ=14° or more and 17° or less, and near 2θ=220 or more and 23° or less.

The percentage of the type I crystal structure occupied in the ultrafine cellulose fibers is preferably 30% or more, more preferably 50% or more, and further preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

In the present description, cellulose fibers have phosphoric acid groups (phosphoric acid groups or phosphoric acid group-derived substituents). In the present invention, such cellulose fibers may also be referred to as "phosphorylated cellulose fibers," "phosphorylated cellulose," or "phosphorylated cellulose fibers."

The phosphoric acid group comprised in the phosphorylated cellulose fibers is a divalent functional group corresponding to a phosphoric acid from which a hydroxyl group is removed. Specifically, it is a group represented by —$PO_3H_2$. The phosphoric acid group-derived substituents include substituents, such as condensation-polymerized phosphoric acid groups, salts of phosphoric acid groups, and phosphoric acid ester groups, and they may preferably be ionic substituents.

In the present invention, the phosphoric acid group or the phosphoric acid group-derived substituent may be a substituent represented by the following Formula (1):

[Formula 1]

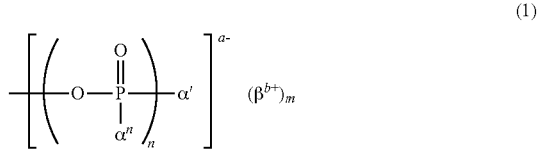

(1)

In the Formula (1), a, b, and n each represent a natural number (provided that a=b×m); at least one of α1, α2, . . . , αn and α' is O⁻, and the rest are either R or OR. All of αn and α' may also be O⁻. When n is 2 or greater and α' is R or OR, at least one of αn is O⁻ and the rest are R or OR. When n is 2 or greater and α' is O⁻, all of an may be R or OR, or at least one of αn may be O⁻ and the rest may be R or OR. R each represents a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an unsaturated cyclic hydrocarbon group, an aromatic group, or a derivative group thereof.

Examples of the saturated straight chain hydrocarbon group include a methyl group, an ethyl group, an n-propyl group, and an n-butyl group, but are not particularly limited thereto. Examples of the saturated branched chain hydrocarbon group include an i-propyl group and a t-butyl group, but are not particularly limited thereto. Examples of the saturated cyclic hydrocarbon group include a cyclopentyl group and a cyclohexyl group, but are not particularly limited thereto. Examples of the unsaturated straight chain hydrocarbon group include a vinyl group and an allyl group, but are not particularly limited thereto. Examples of the unsaturated branched chain hydrocarbon group include an i-propenyl group and a 3-butenyl group, but are not particularly limited thereto. Examples of the unsaturated cyclic hydrocarbon group include a cyclopentenyl group and a cyclohexenyl group, but are not particularly limited thereto. Examples of the aromatic group include a phenyl group and a naphthyl group, but are not particularly limited thereto.

Moreover, examples of the derivative of the above-described R include functional groups such as a carboxyl group, a hydroxyl group or an amino group, in which at least one type selected from functional groups is added to or substituted with the main chain or side chain of the above-described various types of hydrocarbon groups, but are not particularly limited thereto. Furthermore, the number of carbon atoms constituting the main chain of the above-described R is not particularly limited, but it is preferably 20 or less, and more preferably 10 or less. If the number of carbon atoms constituting the main chain of the R exceeds 20, the molecules of phosphorus oxoacid groups containing R become too large, the groups can hardly permeate into a fiber raw material, so that the yield of ultrafine cellulose fibers is likely to be decreased.

βb+ is a mono- or more-valent cation consisting of an organic or inorganic matter. Examples of the mono- or more-valent cation consisting of an organic matter include an aliphatic ammonium and an aromatic ammonium, and examples of the mono- or more-valent cation consisting of an inorganic matter include alkali metal ions such as sodium, potassium or lithium ions, divalent metal cations such as calcium or magnesium ions, and hydrogen ions, but are not particularly limited thereto. These can be applied alone as a single type or in combination of two or more types. As such mono- or more-valent cations consisting of an organic or inorganic matter, sodium or potassium ions, which hardly cause the yellowing of a fiber raw material containing β upon heating and are industrially easily applicable, are preferable, but are not particularly limited thereto.

(Slurry)

The present invention relates to a slurry produced using the aforementioned pulp comprising cellulose fibers. In the present description, such a slurry is also referred to as a "cellulose fiber-containing slurry." The cellulose fibers contained in the slurry of the present invention are preferably ultrafine cellulose fibers. That is to say, the slurry of the present invention preferably relates to a slurry containing phosphorylated ultrafine cellulose fibers having 0.5 mmol/g or more of phosphoric acid groups or phosphoric acid group-derived substituents and also having a fiber width of 1000 nm or less.

When a sheet is formed using the slurry of the present invention under the following condition c, the yellowness $(YI_{30})$ of the sheet relative to a film thickness of 30 μm, which is calculated according to the following Equation d, is 0.57 or less. The yellowness $(YI_{30})$ of the sheet relative to a film thickness of 30 μm is preferably 0.55 or less, more preferably 0.50 or less, and further preferably 0.45 or less.

(Condition c)

the concentration of the phosphorylated ultrafine cellulose fibers in the slurry is adjusted to be 0.5% by mass, and the slurry is then dehydrated by suction filtration using, as a filter medium, a PVDF membrane filter having a pore diameter of 650 nm, until the solid content in the phosphorylated ultrafine cellulose fibers becomes 4% by mass or more. Thereafter, the resulting slurry is subjected to drying under tension for 2 days in a humidity conditioning chamber at 23° C. and a relative humidity of 50%, so as to obtain a sheet having an absolute dry basis weight of 40 g/m².

$$\text{Yellowness } (YI_{30}) \text{ of sheet relative to film thickness}$$
$$\text{of 30 μm} = \text{yellowness } (YI) \text{ of sheet} \times (30 \text{ (μm)})/$$
$$\text{(film thickness of sheet (μm))} \quad \text{(Equation d)}$$

In the above equation, the yellowness (YI) of a sheet is measured in accordance with JIS K 7373. The yellowness (YI) of the sheet is the measured value of the yellowness (YI) of the sheet formed under the above condition c.

To date, there has been a case where a sheet produced using a slurry containing ultrafine cellulose fibers is required to suppress the yellowness thereof. According to the present invention, a slurry capable of realizing a sheet with low yellowness can be obtained, as mentioned above. This is considered because of the use of a pulp with high whiteness, in which exhibition of yellow color is suppressed.

The viscosity of a phosphorylated ultrafine cellulose fiber-containing slurry (hereinafter also referred to as an "ultrafine cellulose fiber-containing slurry") at 25° C. is preferably 8000 mPa·s or more, more preferably 10000 mPa·s or more, and further preferably 11000 mPa·s or more. The upper limit of the viscosity of the ultrafine cellulose fiber-containing slurry at 25° C. is not particularly limited, but it can be set at, for example, 50000 mPa·s.

Herein, the viscosity of the ultrafine cellulose fiber-containing slurry is measured by the following procedures. First, the ultrafine cellulose fiber-containing slurry is diluted to result in a solid concentration of 0.4% by mass, and the resulting slurry is then homogeneously stirred using a disperser at 1500 rpm. The obtained slurry is left at rest for 24 hours, and thereafter, the viscosity of the slurry is measured using a type B viscometer (manufactured by BROOKFIELD; analog viscometer T-LVT). Regarding measurement conditions, the slurry is rotated at 25° C. at 3 rpm for 3 minutes, and the viscosity thereof is then measured.

The haze of the ultrafine cellulose fiber-containing slurry is preferably 10% or less, more preferably 5% or less, and further preferably 3% or less. The haze of the ultrafine cellulose fiber-containing slurry may also be 0%.

Herein, the haze of the ultrafine cellulose fiber-containing slurry is measured by the following procedures. First, the ultrafine cellulose fiber-containing slurry is diluted with ion exchange water to result in a solid concentration of 0.2% by mass, and then, the resulting slurry is homogeneously stirred. Thereafter, the slurry is placed in a glass cell for liquid having an optical path length of 1 cm (manufactured by Fujiwara Scientific Co., Ltd.; MG-40; inverse optical path), and the haze of the slurry is then measured in accordance with JIS K 7136, using a hazemeter (manufactured by MURAKAMI COLOR RESEARCH LABORATORY Co., Ltd.; HM-150). The zero point is measured with ion exchange water which was placed in the glass cell.

The polymerization degree of ultrafine cellulose fibers contained in the ultrafine cellulose fiber-containing slurry is preferably 500 or more, more preferably 600 or more, further preferably 700 or more, and particularly preferably 800 or more. On the other hand, the polymerization degree of the ultrafine cellulose fibers is preferably 2000 or less. Since the above-described polymerization degree is an average polymerization degree measured according to a viscosity method as described later, it is also referred to as a "viscosity average polymerization degree."

The polymerization degree of the ultrafine cellulose fibers is calculated from the viscosity of a pulp measured in accordance with Tappi T230. Specifically, the ultrafine cellulose fibers as a measurement target are dispersed in a dispersion medium, the viscosity thereof is then measured (defined as $\eta1$), and the blank viscosity is then measured using only the dispersion medium (defined as $\eta0$). Thereafter, a specific viscosity ($\eta sp$) and an intrinsic viscosity ($[\eta]$) are calculated according to the following equations.

$$\eta sp = (\eta1/\eta0) - 1$$

$$[\eta] = \eta sp/(c(1+0.28\times\eta sp))$$

In the above equation, c indicates the concentration of ultrafine cellulose fibers upon the measurement of the viscosity.

Further, polymerization degree (DP) is calculated according to the following equation.

$$DP = 1.75 \times [\eta]$$

The cellulose fiber-containing slurry may further comprise other optional components. Examples of such optional components may include antifoaming agents, lubricants, surfactants, ultraviolet absorbing agents, dyes, pigments, fillers, stabilizers, organic solvents miscible with water, such as alcohol, antiseptics, organic fine particles, inorganic fine particles, and resins (pellet-type and fibrous resins). Besides in the present description, a pulp comprising cellulose fibers may comprise hemicellulose, lignin, a resin component (an extracted component such as terpene) and ash, as well as cellulose fibers.

(Method for Producing a Pulp Comprising Cellulose Fibers)

The present invention relates to a method for producing a pulp, comprising a step of bleaching a pulp comprising cellulose fibers having 0.5 mmol/g or more of phosphoric acid groups or phosphoric acid group-derived substituents. Provided that the obtained pulp comprising cellulose fibers is processed into a sheet under the above-described condition A and then, the four sheets obtained under the above-described condition A are laminated on one another to form a test piece defined by JIS P 8148, the method for producing a pulp of the present invention is identical to the method for producing a pulp, in which the obtained laminate has an ISO whiteness of 82% or more, wherein the ISO whiteness is measured in accordance with JIS P 8148.

<Raw Material Pulp>

The raw material pulp for obtaining a pulp comprising cellulose fibers is not particularly limited, but the raw material pulp can be a wood pulp, a non-wood pulp, and a deinked pulp. Examples of the wood pulp include chemical pulps such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulps such as semi-chemical pulp (SCP) and chemi-ground wood pulp (CGP); and mechanical pulps such as ground pulp (GP) and thermomechanical pulp (TMP, BCTMP). Examples of the non-wood pulp include, but not particularly limited to, cotton pulps such as cotton linter and cotton lint; non-wood type pulps such as hemp, wheat straw, and bagasse; and cellulose isolated from ascidian, seaweed, etc., chitin, and chitosan. As a deinked pulp, there is a deinked pulp using a waste paper as a raw material, but it is not particularly limited thereto. The pulp of the present embodiment may be used singly, or in combination of two or more types. Among the above-listed pulp types, a wood pulp and a deinked pulp including cellulose are preferable from the viewpoint of easy availability.

The raw material pulp is obtained by digesting chipped wood materials such as hard wood or soft wood, or chipped non-wood materials such as herbaceous plants, with a digestion liquid consisting of caustic soda or sodium sulfide, and then performing a bleaching treatment on the resulting materials. As such a raw material pulp, a pulp, from which coloration-causing substances such as lignin have been removed, is used.

<Phosphoric Acid Group Introduction Step>

The phosphoric acid group introduction step is a step of introducing phosphoric acid groups into cellulose fibers comprised in the raw material pulp obtained as described above. The phosphoric acid group introduction step may be performed by allowing at least one selected from a compound having phosphoric acid groups or phosphoric acid group-derived substituents and salts thereof (hereinafter, referred to as a "phosphorylating agent" or "Compound A") to react with a pulp comprising cellulose fibers. Such a phosphorylating agent may be mixed into the pulp comprising cellulose fibers in a dry or wet state, in the form of a powder or an aqueous solution. In another example, a powder or an aqueous solution of the phosphorylating agent may be added into a slurry of the pulp comprising cellulose fibers. That is to say, the phosphoric acid group introduction step includes, at least, a step of mixing a pulp comprising cellulose fibers with a phosphorylating agent.

The phosphoric acid group introduction step may be performed by allowing a phosphorylating agent to react with a pulp comprising cellulose fibers. This reaction may be performed in the presence of at least one selected from urea and derivatives thereof (hereinafter, referred to as "Compound B").

One example of the method of allowing Compound A to act on the pulp comprising cellulose fibers in the presence of Compound B includes a method of mixing a powder or an aqueous solution of Compound A and Compound B with the pulp comprising cellulose fibers in a dry or wet state. Another example thereof includes a method of adding a powder or an aqueous solution of Compound A and Compound B to a slurry of the pulp comprising cellulose fibers. Among them, a method of adding an aqueous solution of Compound A and Compound B to the pulp comprising cellulose fibers in a dry state, or a method of adding a powder or an aqueous solution of Compound A and Compound B to the pulp comprising cellulose fibers in a wet state is preferable because of the high homogeneity of the reaction. Compound A and Compound B may be added at the same time or may be added separately. Alternatively, Compound A and Compound B to be subjected to the reaction may be first added as an aqueous solution, which may be then compressed to squeeze out redundant chemicals. The form of the pulp comprising cellulose fibers is preferably a cotton-like or thin sheet form, but the form is not particularly limited thereto.

The phosphorylating agent (Compound A) is at least one selected from compounds having phosphoric acid groups and the salts thereof. Examples of the compound having phosphoric acid groups include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate. Among these, phosphoric acid, sodium salts of phosphoric acid, potassium salts of phosphoric acid, and ammonium salts of phosphoric acid are preferably used.

Since the uniformity of the reaction is improved and the efficiency in introduction of a phosphoric acid group is further enhanced, the phosphorylating agent (Compound A) is preferably used as an aqueous solution. Although there is no particular restriction on the pH of an aqueous solution of the phosphorylating agent (Compound A), the pH is preferably pH 7 or less because the efficiency in introduction of phosphoric acid groups becomes high, and more preferably pH 3 or more and pH 7 or less from the viewpoint of suppression of hydrolysis of cellulose fibers. The pH of an aqueous solution of the Compound A may be adjusted, for example, by using, among compounds having phosphoric acid groups, a combination of an acidic one and an alkaline one, and changing the amount ratio thereof. The pH of an aqueous solution of the phosphorylating agent (Compound A) may also be adjusted by adding an inorganic alkali or an organic alkali to an acidic compound among compounds having phosphoric acid groups.

The amount of the phosphorylating agent (Compound A) added to the pulp comprising cellulose fibers is not particularly limited. However, when the additive amount of the phosphorylating agent (Compound A) is converted to the amount of phosphorus atoms, the amount of the phosphorus atoms added to cellulose fibers (absolute dry mass) is preferably 0.5% by mass or more and 100% by mass or less, more preferably 1% by mass or more and 50% by mass or less, and most preferably 2% by mass or more and 30% by mass or less. If the amount of the phosphorus atoms added to cellulose fibers is within the above-described range, the yield of phosphorylated cellulose fibers can be further improved. By setting the amount of the phosphorus atoms added to cellulose fibers at 100% by mass or less, a balance can be kept between the effect of improving the yield and costs. On the other hand, by setting the amount of the phosphorus atoms added to cellulose fibers at the above-described lower limit value or more, the yield can be enhanced.

Examples of the Compound B used in the present embodiment include urea, biuret, 1-phenyl urea, 1-benzyl urea, 1-methyl urea, and 1-ethyl urea.

The Compound B is preferably used as an aqueous solution, as with the Compound A. Further, an aqueous solution in which both the Compound A and Compound B are dissolved is preferably used, because the uniformity of a reaction may be enhanced. The amount of the Compound B added to cellulose fibers (absolute dry mass) is preferably 1% by mass or more and 500% by mass or less, more preferably 10% by mass or more and 400% by mass or less, further preferably 100% by mass or more and 350% by mass or less, and particularly preferably 150% by mass or more and 300% by mass or less.

The reaction system may contain an amide or an amine, in addition to the Compound A and the Compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

The phosphoric acid group introduction step preferably has a heating step (hereinafter also referred to as a "heat treatment step"). By establishing such a heat treatment step, phosphoric acid groups can be efficiently introduced into cellulose fiber.

With regard to the heat treatment temperature applied in the heat treatment step, it is preferable to select a temperature that allows an efficient introduction of phosphoric acid groups while suppressing the thermal decomposition or hydrolysis reaction of cellulose fibers. Specifically, the temperature is preferably 50° C. or higher and 300° C. or lower, more preferably 100° C. or higher and 250° C. or lower, and further preferably 130° C. or higher and 200° C. or lower. Moreover, a vacuum dryer, an infrared heating device, or a microwave heating device may be used for heating.

Upon the heat treatment, if the time for leaving the pulp comprising cellulose fibers to stand still gets longer while a slurry of the pulp comprising cellulose fibers to which the Compound A is added contains water, as drying advances, water molecules and the Compound A dissolved therein move to the surface of the cellulose fibers. As such, there is a possibility of the occurrence of unevenness in the concentration of the Compound A in the cellulose fibers, and the introduction of phosphoric acid groups into the cellulose fiber surface may not progress uniformly. In order to suppress the occurrence of unevenness in the concentration of the Compound A in the cellulose fibers due to drying, the pulp comprising cellulose fibers in the shape of a very thin sheet may be used, or a method of heat-drying or vacuum-drying the pulp comprising cellulose fibers, while kneading or stirring with the Compound A using a kneader or the like, may be employed.

As a heating device used for heat treatment, a device capable of always discharging moisture retained by slurry or moisture generated by an addition reaction of phosphoric acid groups with hydroxy groups of the fiber to the outside of the device system is preferable, and for example, forced convection ovens or the like are preferable. By always discharging moisture in the device system, in addition to being able to suppress a hydrolysis reaction of phosphoric acid ester bonds, which is a reverse reaction of the phosphoric acid esterification, acid hydrolysis of sugar chains in the cellulose fibers may be suppressed as well.

The time for the heat treatment is, although affected by the heating temperature, preferably 1 second or more and 300 minutes or less, more preferably 1 second or more and 1000 seconds or less, and further preferably 10 seconds or more and 800 seconds or less, after water has been substantially removed from the pulp slurry. In the present invention, by setting the heating temperature and the heating time within an appropriate range, the amount of phosphoric acid groups introduced can be set within a preferred range.

The phosphoric acid group introduction step may be performed at least once, but may be repeated multiple times as well. This case is preferable, since more phosphoric acid groups are introduced. For example it is also a preferred aspect that the phosphoric acid group introduction step is carried out twice.

<Alkali Treatment Step>

After completion of the phosphoric acid group introduction step, it is preferable to establish an alkali treatment step. The method of alkali treatment is not particularly limited, but a method of immersing the phosphorylated cellulose fibers in an alkaline solution is applied, for example.

The alkali compound contained in the alkaline solution is not particularly limited, but it may be either an inorganic alkaline compound or an organic alkali compound. The solvent of the alkaline solution may be either water or an organic solvent. The solvent is preferably a polar solvent (water, or a polar organic solvent such as alcohol), and the solvent may also be an aqueous solvent. Among alkaline solutions, a sodium hydroxide aqueous solution, or a potassium hydroxide aqueous solution is particularly preferable, because of high versatility.

The temperature of the alkaline solution in the alkali treatment step is not particularly limited, but it is preferably 5° C. or higher and 80° C. or lower, and more preferably 10° C. or higher and 60° C. or lower.

The immersion time in the alkaline solution in the alkali treatment step is not particularly limited, but it is preferably 5 minutes or more and 30 minutes or less, and more preferably 10 minutes or more and 20 minutes or less.

The amount of the alkaline solution used in the alkali treatment is not particularly limited, but it is preferably 100% by mass or more and 100000% by mass or less, and more preferably 1000% by mass and 10000% by mass or less, with respect to the absolute dry mass of the phosphorylated cellulose fibers.

In order to reduce the amount of an alkaline solution used in the alkali treatment step, the pulp comprising phosphorylated cellulose fibers may be washed with water or an organic solvent before the alkali treatment step. After the alkali treatment, the alkali-treated pulp comprising phosphorylated cellulose fibers is preferably washed with water or an organic solvent in order to improve the handling property.

<Bleaching Step>

After completion of the aforementioned phosphoric acid group introduction step or alkali treatment step, a bleaching step is established. The bleaching step is a step of bleaching the pulp comprising cellulose fibers having 0.5 mmol/g or more of phosphoric acid groups or phosphoric acid group-derived substituents, which is obtained in the aforementioned phosphoric acid group introduction step.

Since the phosphorylation treatment is generally carried out under weakly acidic conditions and is also attended with a heat treatment at a high temperature, it is considered that novel coloration-causing substances that are not derived from the raw material pulp are generated in the phosphorylation treatment process. Accordingly, it is desired to carry out the bleaching treatment after completion of the phosphoric acid group introduction step.

Examples of the bleaching agent that can be used in the bleaching step include hydrogen peroxide, hydrosulfite, thiourea dioxide, sodium hypochlorite, and chlorine dioxide. In the bleaching step, the bleaching agent may be used in combination with a bleaching aid, and an example of such a bleaching aid may be a nonionic surfactant.

In the bleaching step, the bleaching agent is preferably added to a slurry, in which the concentration of a pulp comprising phosphorylated cellulose fibers has been adjusted to 0.2% by mass or more and 20% by mass or less. At this time, the addition percentage of the bleaching agent is preferably 0.1% by mass or more, more preferably 0.5% by mass or more, and further preferably 1% by mass or more, with respect to the total mass of the phosphorylated cellulose fibers in the slurry. On the other hand, the addition percentage of the bleaching agent is preferably 30% by mass or less with respect to the total mass of the phosphorylated cellulose fibers in the slurry. When the bleaching agent is a chlorine bleaching agent, the bleaching agent is added to the slurry, so that the effective chlorine concentration in the slurry preferably becomes 50 ppm or more, and more preferably becomes 100 ppm or more. The upper limit of the effective chlorine concentration is preferably 2000 ppm. By setting the amount of the bleaching agent added within the above-described range, a pulp comprising cellulose fibers having high whiteness can be obtained.

The bleaching treatment temperature is preferably 10° C. or higher, more preferably 20° C. or higher, and further preferably 25° C. or higher. On the other hand, the bleaching treatment temperature is preferably 150° C. or lower, and more preferably 100° C. or less. By setting the bleaching treatment temperature within the above-described range, a pulp comprising cellulose fibers having high whiteness can be obtained.

The bleaching treatment time is preferably 10 seconds or more, more preferably 30 seconds or more, further preferably 1 minute or more, and particularly preferably 5 minutes or more. On the other hand, the bleaching treatment time is preferably 1 hour or less, and more preferably 30 minutes or less.

After completion of the bleaching step, a neutralization step may be established. In the neutralization step, when a chlorine bleaching agent is particularly used as a bleaching agent, the bleaching agent remaining in the slurry can be neutralized by adding a neutralizing agent such as, for example, sodium thiosulfate or sodium sulfite, so that the bleaching treatment can be terminated.

After completion of the neutralization step, a washing step is preferably established. In addition, after completion of the neutralization step, the aforementioned alkali treatment step may be established again.

<Defibration Treatment>

The cellulose fibers are ultrafine cellulose fibers having a fiber width of 1000 nm or less, a defibration treatment step may be established after completion of the bleaching step. In the defibration treatment step, fibers are defibrated usually using a defibration treatment apparatus to yield a slurry comprising ultrafine cellulose fibers, and there is no particular restriction on a treatment apparatus, or a treatment method.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may also be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and are free from apprehension of contamination.

Upon the defibration treatment, the fiber raw material is preferably diluted with water and an organic solvent each alone or in combination, to prepare a slurry, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

With regard to the ultrafine cellulose fibers, the ultrafine cellulose fiber-containing slurry obtained by the defibration treatment may be once concentrated and/or dried, and then, may be subjected to a defibration treatment again. In this case, there is no particular restriction on the method of concentration and drying, but examples thereof include a method in which a concentrating agent is added into a slurry comprising ultrafine cellulose fibers, and a method using a dehydrator, a press, a dryer, and the like used generally. Further, publicly known methods, for example as described in WO 2014/024876, WO 2012/107642, and WO 2013/121086, may be used. Also, the ultrafine cellulose fiber-containing slurry may be formed into a sheet, so that it is concentrated and dried. The formed sheet is subjected to a defibration treatment, so that an ultrafine cellulose fiber-containing slurry can be obtained again.

Examples of a device used for defibrating (pulverizing) the ultrafine cellulose fiber-containing slurry again, after the concentration and/or drying of the ultrafine cellulose fiber-containing slurry, include, but are not particularly limited to, a high-speed defibrator, a grinder (stone mill-type grinder), a high-pressure homogenizer, an ultra-high pressure homogenizer, a high-pressure collision type crusher, a ball mill, a bead mill, a disk type refiner, a conical refiner, a twin screw kneader, a vibrating mill, and a device for wet milling, such as a high-speed rotating homomixer, an ultrasonic disperser, or a beater.

(Physical Properties of Cellulose Fibers (Pulp) Before and after Bleaching)

The method for producing a pulp comprising cellulose fibers of the present invention is also characterized in that various types of physical properties of cellulose fibers or a pulp comprising the cellulose fibers are not largely changed before and after the bleaching step. Specifically, in the method for producing a pulp comprising cellulose fibers of the present invention, even in the case of bleaching a pulp comprising cellulose fibers having 0.5 mmol/g or more of phosphoric acid groups or phosphoric acid group-derived substituents, the cellulose fibers or the pulp comprising the cellulose fibers can maintain the physical properties or characteristics thereof.

In the present invention, a difference between the amount of phosphoric acid groups in cellulose fibers before the bleaching step and the amount of phosphoric acid groups in cellulose fibers after the bleaching step is preferably 0.2 mmol/g or less, more preferably 0.1 mmol/g or less, and further preferably 0.05 mmol/g or less.

Moreover, in the present invention, ultrafine cellulose fibers capable of setting a reduction in the polymerization degree within a desired range can be obtained from a pulp comprising cellulose fibers. Specifically, a difference between the viscosity average polymerization degree of ultrafine cellulose fibers obtained by subjecting a pulp comprising cellulose fibers before the bleaching step to a fibrillation treatment performed under the following condition e, and the viscosity average polymerization degree of ultrafine cellulose fibers obtained by subjecting a pulp comprising cellulose fibers after the bleaching step to a fibrillation treatment performed under the following condition e, is preferably 100 or less, more preferably 50 or less, and further preferably 30 or less.

(Condition e)

A pulp comprising cellulose fibers is diluted with ion exchange water to a concentration of 0.5% by mass, so as to obtain a slurry, and the slurry is then subjected to a fibrillation treatment using CLEARMIX-2.2S manufactured by M Technique Co., Ltd., at a rotation number of 21500 rpm for 30 minutes.

The viscosity average polymerization degree of ultrafine cellulose fibers obtained by performing a fibrillation treatment under the above-described condition e is a value calculated from the viscosity of a pulp measured in accordance with Tappi T230. Specifically, the ultrafine cellulose fibers are dispersed in a dispersion medium, the viscosity thereof is then measured (defined as $\eta 1$), and the viscosity of only the dispersion medium is then measured (defined as $\eta 0$). Thereafter, a specific viscosity ($\eta sp$) and an intrinsic viscosity ($[\eta]$) are calculated according to the following equations.

$$\eta sp = (\eta 1/\eta 0) - 1$$

$$[\eta] = \eta sp/(c(1+0.28 \times \eta sp))$$

In the above equation, c indicates the concentration of ultrafine cellulose fibers upon the measurement of the viscosity.

Further, polymerization degree (DP) is calculated according to the following equation.

$$DP = 1.75 \times [\eta]$$

Since this polymerization degree is an average polymerization degree measured according to a viscosity method, it is referred to as a "viscosity average polymerization degree."

Furthermore, in the present invention, ultrafine cellulose fibers capable of exhibiting a desired viscosity can be obtained from a pulp comprising cellulose fibers. Specifically, a pulp comprising cellulose fibers before the bleaching step is subjected to a fibrillation treatment under the condition e to obtain an ultrafine cellulose fiber-containing slurry 1 having a concentration of 0.4% by mass. The viscosity of this slurry 1 is defined as P. On the other hand, a pulp comprising cellulose fibers after the bleaching step is subjected to a fibrillation treatment under the condition e to obtain an ultrafine cellulose fiber-containing slurry 2 having a concentration of 0.4% by mass. The viscosity of this slurry 2 is defined as Q. The P/Q value is preferably 0.5 or more and 2.0 or less. The P/Q value is more preferably 0.5 or more and 1.5 or less, and further preferably 0.5 or more and 1.2 or less.

It is to be noted that the viscosity of such an ultrafine cellulose fiber-containing slurry is obtained by homogeneously stirring a slurry using a disperser at 1500 rpm, then leaving the obtained slurry at rest for 24 hours, and then measuring the viscosity of the resulting slurry using a type B viscometer (manufactured by BROOKFIELD; analog viscometer T-LVT). Regarding measurement conditions, the slurry is rotated at 25° C. at 3 rpm for 3 minutes, and then, the viscosity is measured.

(Sheet)

The present invention also relates to a sheet produced using the pulp comprising cellulose fibers as mentioned above in the present description. The cellulose fibers contained in the sheet of the present invention are, for example, ultrafine cellulose fibers. In the present description, the sheet containing ultrafine cellulose fibers is also referred to as an "ultrafine cellulose fiber-containing sheet." The sheet of the present invention relates to a sheet containing phosphorylated ultrafine cellulose fibers having 0.5 mmol/g or more of phosphoric acid groups or phosphoric acid group-derived substituents and also having a fiber width of 1000 nm or less.

In the sheet of the present invention, $YI_{30}$ calculated by the following Equation d is 0.57 or less. $YI_{30}$ is preferably 0.55 or less, more preferably 0.50 or less, and further preferably 0.45 or less.

Yellowness ($YI_{30}$) of sheet relative to film thickness of 30 μm=yellowness ($YI$) of sheet×(30 (μm))/(film thickness of sheet (μm))     (Equation d)

In the above equation, the yellowness (YI) of a sheet is measured in accordance with JIS K 7373.

(Method for Producing Sheet)

The sheet of the present invention can be produced, for example, by filtrating a composition comprising ultrafine cellulose fibers (e.g., a suspension or a slurry) to form a wet sheet on the filter. The formed wet sheet is peeled off from the filter, and is then dried on a stainless steel tray or the like, so that a dried sheet can be obtained.

Alternatively, the sheet of the present invention can be produced by applying a composition comprising ultrafine cellulose fibers (e.g., a suspension or a slurry) onto a base material, or by papermaking from a composition comprising ultrafine cellulose fibers (e.g., a suspension or a slurry).

<Coating Step>

The coating step is a step of applying a composition (slurry, etc.) onto a base material, and then drying the composition to form a sheet. Use of a coating apparatus and a long base material can continuously produce sheets. When a slurry is applied onto a base material, the concentration of the slurry to be applied is not particularly limited, but it is preferably 0.05% by mass or more and 5% by mass or less.

The material of the base material used in the coating step is not particularly limited. Although a base material having higher wettability to the composition (slurry) is preferable because shrinkage of the sheet or the like upon drying is suppressed, it is preferable to select one from which a sheet formed after drying can be easily detached. Of these, a resin film or plate, or a metal film or plate is preferable, but is not particularly limited thereto. Examples of the base material that can be used herein include: resin films or plates, such as those made of acrylic acid, polyethylene terephthalate, vinyl chloride, polystyrene, or polyvinylidene chloride; metal films or plates, such as those made of aluminum, zinc, copper, or iron; these films or plates obtained by the oxidation treatment of surface thereof; and stainless films or plates and brass films or plates.

When the composition (slurry) has a low viscosity and spreads on the base material in the coating step, a damming frame may be fixed and used on the base material in order to obtain an ultrafine cellulose fiber-containing sheet having a predetermined thickness and basis weight. The material of the damming frame is not particularly limited, but it is preferable to select ones from which edges of the sheet adhere after drying can be easily detached. Of these, frames formed from resin films or plates or metal films or plates are preferable, but are not particularly limited thereto. Example thereof that can be used herein include frames formed from resin films or plates, such as those made of acrylic acid, polyethylene terephthalate, vinyl chloride, polystyrene, or polyvinylidene chloride; from metal films or plates, such as those made of aluminum, zinc, copper, or iron; from these films or plates obtained by the oxidation treatment of surface thereof; and from stainless films or plates and brass films or plates.

Examples of a coater for applying the composition (slurry) that can be used herein include roll coaters, gravure coaters, die coaters, curtain coaters, and air doctor coaters. die coaters, curtain coaters, and spray coaters are preferable because more even thickness can be provided.

The coating temperature is not particularly limited, but it is preferably 20° C. or higher and 45° C. or lower, more preferably 25° C. or higher and 40° C. or lower, and further preferably 27° C. or higher and 35° C. or lower. When the coating temperature is equal to or higher than the above-described lower limit value, it is possible to easily apply the composition (slurry). When the coating temperature is equal to or lower than the above-described upper limit value, it is possible to suppress volatilization of the dispersion medium upon coating.

In the coating step, it is preferable to apply the slurry so as to achieve a finished basis weight of the sheet that is 10 g/m² or more and 100 g/m² or less. By applying the slurry so as to achieve a basis weight that is within the above-described range, a sheet having excellent strength can be obtained.

The step of forming a sheet preferably includes a step of drying the composition (slurry) applied onto the base material. The drying method is not particularly limited, but any of a contactless drying method and a method of drying the sheet while locking the sheet may be used, or these methods may also be used in combination.

The contactless drying method is not particularly limited, but a method for drying by heating with hot air, infrared radiation, far-infrared radiation, or near-infrared radiation (a drying method by heating) or a method for drying in vacuum (a vacuum drying method) can be utilized. Although the drying method by heating and the vacuum drying method may be combined, the drying method by heating is usually utilized. The drying with infrared radiation, far-infrared radiation, or near-infrared radiation can be performed using an infrared apparatus, a far-infrared apparatus, or a near-infrared apparatus without particular limitations. The heating temperature for the drying method by heating is not particularly limited, but it is preferably 20° C. or higher and 120° C. or lower, and more preferably 25° C. or higher and 105° C. or lower. At the heating temperature equal to or higher than the above-described lower limit value, the dispersion medium can be rapidly volatilized. At the heating temperature equal to or lower than the above-described upper limit value, cost required for the heating can be reduced, and the thermal discoloration of the ultrafine cellulose fibers can be suppressed.

The sheet may be peeled off from the base material, and may be then wound up. Alternatively, a laminate of the sheet and the base material may be directly wound up, and the sheet may be then peeled off from the base material immediately before the use thereof. Otherwise, a laminate comprising a base material as a portion thereof may be used without peeling the base material off.

<Papermaking Step>

The step of forming a sheet may include a step of papermaking from a composition (slurry). Examples of a paper machine used in the papermaking step include continuous paper machines such as a Fourdrinier paper machine, a cylinder paper machine, and an inclined paper machine, and a multilayer combination paper machine, which is a combination thereof. Known papermaking such as papermaking by hand may be carried out in the papermaking step.

In the papermaking step, the composition (slurry) is wire-filtered and dehydrated to obtain a sheet that is in a wet state. The sheet is then pressed and dried to obtain a sheet. The concentration of the slurry is not particularly limited, but it is preferably 0.05% by mass or more and 5% by mass or less. Upon filtration and dehydration of the slurry, a filter fabric for filtration is not particularly limited. It is important that ultrafine cellulose fibers do not pass through the filter fabric and the filtration speed is not excessively slow. Such filter fabric is not particularly limited, and a sheet consisting of an organic polymer, a woven fabric, or a porous membrane is preferable. Preferred examples of the organic polymer include, but are not particularly limited to, non-cellulose organic polymers such as polyethylene terephthalate, polyethylene, polypropylene, and polytetrafluoroethylene (PTFE). Specific examples thereof include, but are not particularly limited to, a polytetrafluoroethylene porous membrane having a pore size of 0.1 μm or more and 20 μm or less, for example, 1 μm, and woven fabric made of polyethylene terephthalate or polyethylene having a pore size of 0.1 μm or more and 20 μm or less, for example, 1 μm.

A method for producing a sheet from a composition (slurry) is not particularly limited, but an example thereof is the method disclosed in WO 2011/013567 comprising using a production apparatus. This production apparatus comprises a dewatering section for ejecting an ultrafine cellulose fiber-containing slurry onto the upper surface of an endless belt and then dewatering a dispersion medium contained in the ejected slurry to form a web, and a drying section for drying the web to produce a fiber sheet. The endless belt is provided across from the dewatering section to the drying section, and the web formed in the dewatering section is transferred to the drying section while being placed on the endless belt.

The dehydration method that can be used in the present invention is not particularly limited. An example of the method is a dehydration method conventionally used for paper production. A preferred example is a method comprising performing dehydration using a Fourdrinier, cylinder, tilted wire, or the like and then performing dehydration using a roll press. In addition, a drying method is not particularly limited, but an example thereof is a method used for paper production and for example a method using a cylinder dryer, a yankee dryer, hot air drying, a near-infrared heater, or an infrared heater is preferable.

(Laminate)

In the present invention, a laminate having the aforementioned sheet and a resin layer that is disposed on at least one surface of the sheet may be produced.

The resin layer is a layer that has a natural resin or a synthetic resin as a main component. In this context, the main component refers to a component comprised in 50% by mass or more, based on the total mass of the resin layer. The content of the resin is preferably 60% by mass or more, more preferably 70% by mass or more, further preferably 80% by mass or more, and particularly preferably 90% by mass or more, based on the total mass of the resin layer. It is to be noted that the content of the resin may be set at 100% by mass, or may also be set at 95% by mass or less.

Examples of natural resins may include rosin-based resins, such as rosin, rosin ester and hydrated rosin ester.

The synthetic resin is preferably at least one selected from, for example, polycarbonate resins, polyethylene terephthalate resins, polyethylene naphthalate resins, polyethylene resins, polypropylene resins, polyimide resins, polystyrene resins, acrylic resins, epoxy resins, urethane resins, fluorine resins, and silicon resins. Among them, the synthetic resin is preferably a polycarbonate resin, an acrylic resin, or a silicon resin.

Moreover, the synthetic resin may also be an adhesive that constitutes an adhesive layer. Examples of such a synthetic resin include acrylic resins, vinyl chloride resins, (meth) acrylic acid ester resins, styrene/acrylic acid ester copolymer resins, vinyl acetate resins, vinyl acetate/(meth)acrylic acid ester copolymer resins, urethane resins, silicone resins, epoxy resins, ethylene/vinyl acetate copolymer resins, polyester-based resins, polyvinyl alcohol resins, ethylene vinyl alcohol copolymer resins, and rubber-based emulsions such as SBR and NBR.

One resin that constitutes the resin layer may be used alone, or a copolymer obtained by copolymerization or graft polymerization of a plurality of resin components may be used. Alternatively, a plurality of resin components may be mixed by a physical process and used as a blend material.

As a resin layer established on each surface side of the sheet, a single resin layer may be established, or multiple resin layers may also be established. In the case of establishing multiple resin layers, the resin layers each comprising the aforementioned adhesive constituting an adhesive layer and at least one selected from a polycarbonate resin, an acrylic resin and a silicon resin may be formed.

Upon the production of a laminate, a laminate may be formed by applying a resin composition for use in the formation of a resin layer on a sheet. Otherwise, the previously formed resin layer may be laminated on a sheet. In this case, an adhesive layer may be established between the resin layer and the sheet, and such an adhesive layer is included in the resin layer. Moreover, when the base material used in the production of a sheet is a resin, the base material may not be peeled off, and may be used as a portion of the resin layer.

(Intended Use)

The pulp comprising cellulose fibers of the present invention is used in various forms. For example, the pulp comprising cellulose fibers of the present invention may be processed into a form such as a slurry or a solid. When the pulp comprising cellulose fibers of the present invention is a solid, a sheet or a particulate may be formed from the pulp comprising cellulose fibers. Since such a sheet or a particulate has high whiteness, they are preferably used in intended uses required to have high whiteness. For example, from the viewpoint of utilizing such properties as high whiteness, it is suitable for the pulp comprising cellulose fibers of the present invention to be used in absorbing materials such as diapers or sanitary goods, which are required to have apparent cleanliness, and in dust filters, which are also required to have cleanliness.

Moreover, the amount of phosphoric acid groups introduced into the aforementioned cellulose fibers after the bleaching step is at the same level as that of the amount of phosphoric acid groups introduced into cellulose fibers before the bleaching step, and thus, the amount of phosphoric acid groups introduced is sufficient. Accordingly, the aforementioned cellulose fibers can be easily fibrillated, and thus, a phosphorylated ultrafine cellulose fiber-containing slurry or a phosphorylated ultrafine cellulose fiber-containing sheet has sufficiently high transparency. That is, sufficiently fibrillated phosphorylated ultrafine cellulose fibers with less colored can be obtained. From the viewpoint of utilizing the aforementioned properties, the phosphorylated ultrafine cellulose fibers are suitable for intended uses, such as light transmissible substrates for various display devices, various solar cells, and the like. In addition, the phosphorylated ultrafine cellulose fibers are also suitable for intended uses, such as substrates of electronic devices, components of consumer electronics, window materials of various types of vehicles or buildings, interior materials, exterior materials, and wrapping materials. Moreover, the phosphorylated ultrafine cellulose fibers are also suitable for intended uses, such as threads, filters, woven fabrics, buffering materials, sponges, and polishing materials, and also, other intended uses, in which the sheet itself is used as a reinforcing material.

EXAMPLES

The characteristics of the present invention will be more specifically described in the following examples and comparative examples. The materials, used amounts, ratios, treatment contents, treatment procedures, etc. described in the following examples can be appropriately modified, unless they are deviated from the gist of the present invention. Accordingly, the scope of the present invention should not be restrictively interpreted by the following specific examples.

Example 1

<Phosphorylation Reaction Step>

Pulp manufactured by Oji Paper Co., Ltd. (solid content: 93% by mass, basis weight: 208 g/m$^2$, sheet-shaped, Canadian Standard Freeness (CSF) measured according to JIS P 8121 after disintegration: 700 ml), which was needle bleached kraft pulp, was used as a raw material. A mixed aqueous solution of ammonium dihydrogen phosphate and urea was added to 100 parts by mass of the needle bleached kraft pulp (absolute dry mass), and the obtained mixture was then compressed to result in 45 parts by mass of the ammonium dihydrogen phosphate, 120 parts by mass of the urea, and 150 parts by mass of ion exchange water, so as to obtain a chemical-impregnated pulp. The obtained chemical-impregnated pulp was subjected to drying and heating treatments in a hot-air dryer of 165° C. for 200 seconds, so that phosphoric acid groups were introduced into cellulose in the pulp, thereby obtaining a pulp comprising phosphorylated cellulose fibers A.

<Washing and Alkali Treatment Step>

Ion exchange water was poured onto the obtained pulp comprising phosphorylated cellulose fibers A, followed by stirring the obtained mixture for uniform dispersion. Thereafter, the reaction mixture was subjected to filtration and dehydration to obtain a dehydrated sheet. By repeating this operation, redundant chemical liquid was fully washed away. Subsequently, the resultant was diluted with ion exchange water, so that the concentration of the pulp comprising phosphorylated cellulose fibers became 2% by mass, and then, a 1 N sodium hydroxide aqueous solution was gradually added to the resultant, while stirring, so as to obtain a slurry with pH 12±0.2. Thereafter, this slurry was dehydrated to obtain a dehydrated sheet, and ion exchange water was then poured onto the dehydrated sheet again, followed by stirring the obtained mixture for uniform dispersion. After that, the reaction mixture was subjected to filtration and dehydration to obtain a dehydrated sheet. By repeating this operation, redundant sodium hydroxide was fully washed away, so as to obtain a pulp comprising phosphorylated cellulose fibers B.

<Bleaching and Alkali Treatment Step>

Ion exchange water was poured onto the obtained pulp comprising phosphorylated cellulose fibers B, so that the concentration of the pulp comprising phosphorylated cellulose fibers became 2% by mass, and the obtained mixture was homogeneously stirred to obtain 499 g of a suspension. To the suspension, 5 mL of sodium hypochlorite having an effective chlorine concentration of 53.8 g/L was added, so that the effective chlorine concentration in the suspension became 549 ppm, and while stirring, a bleaching treatment was initiated at room temperature. It is to be noted that the additive amount of sodium hypochlorite was 2.7% by mass with respect to the mass of the pulp comprising phosphorylated cellulose fibers. After the bleaching treatment had been performed for 5 minutes, 0.1 N sodium thiosulfate was added to the suspension in an amount sufficient for converting the effective chlorine concentration in the suspension to 0 (zero), so that the effective chlorine remaining in the suspension was neutralized and the bleaching treatment was thereby terminated. By repeating the operation of performing filtration and dehydration on the bleached suspension to obtain a dehydrated sheet, remaining ions such as redundant sodium thiosulfate were fully washed away. Subsequently, the resultant was diluted with ion exchange water, so that the concentration of the pulp comprising phosphorylated cellulose fibers became 2% by mass, and while stirring, a 1 N sodium hydroxide aqueous solution was gradually added to the solution to obtain a pulp slurry with pH 12±0.2. Thereafter, this pulp slurry was dehydrated to obtain a dehydrated sheet, and ion exchange water was poured on the sheet again, followed by stirring for uniform dispersion. Then, the resulting solution was subjected to filtration and dehydration to obtain a dehydrated sheet. By repeating this operation of obtaining a dehydrated sheet, redundant sodium hydroxide was fully washed away, so as to obtain a pulp comprising bleached phosphorylated cellulose fibers C. The ISO whiteness, hue, and polymerization degree of the pulp comprising bleached phosphorylated cellulose fibers C were measured according to the after-mentioned methods.

<Mechanical Treatment>

Ion exchange water was added to the pulp comprising bleached phosphorylated cellulose fibers C, so as to prepare a suspension, in which the concentration of the pulp comprising bleached phosphorylated cellulose fibers was 0.5% by mass. This suspension was subjected to a fibrillation treatment (defibration treatment), using a defibration treatment device (manufactured by M Technique Co., Ltd., CLEARMIX-2.2S) under conditions of 21500 rpm for 30 minutes, to obtain an ultrafine cellulose fiber-containing slurry. The obtained ultrafine cellulose fiber-containing slurry was measured in terms of supernatant yield, viscosity, haze, and the amount of phosphoric acid groups contained therein, according to the after-mentioned methods.

Example 2

A pulp comprising phosphorylated cellulose fibers B and a pulp comprising bleached phosphorylated cellulose fibers C were obtained in the same manner as that of Example 1, with the exception that 1 mL of sodium hypochlorite having an effective chlorine concentration of 53.8 g/L was added, so that the effective chlorine concentration in the suspension became 110 ppm in the <Bleaching and alkali treatment step> of Example 1.

Example 3

A pulp comprising phosphorylated cellulose fibers B and a pulp comprising bleached phosphorylated cellulose fibers C were obtained in the same manner as that of Example 1, with the exception that 10 mL of sodium hypochlorite having an effective chlorine concentration of 53.8 g/L was added, so that the effective chlorine concentration in the suspension became 1097 ppm in the <Bleaching and alkali treatment step> of Example 1.

Example 4

A pulp comprising phosphorylated cellulose fibers B, a pulp comprising bleached phosphorylated cellulose fibers C, and an ultrafine cellulose fiber-containing slurry were obtained in the same manner as that of Example 1, with the exception that the bleaching treatment time was set at 1 minute in the <Bleaching and alkali treatment step> of Example 1.

Example 5

A pulp comprising phosphorylated cellulose fibers B, a pulp comprising bleached phosphorylated cellulose fibers C, and an ultrafine cellulose fiber-containing slurry were obtained in the same manner as that of Example 1, with the exception that the bleaching treatment time was set at 15 minutes in the <Bleaching and alkali treatment step> of Example 1.

Example 6

A pulp comprising phosphorylated cellulose fibers B and a pulp comprising bleached phosphorylated cellulose fibers C were obtained in the same manner as that of Example 1, with the exception that, in the <Bleaching and alkali treatment step> of Example 1, 1 mL of sodium hypochlorite having an effective chlorine concentration of 53.8 g/L was added, so that the effective chlorine concentration in the suspension became 110 ppm, and the bleaching treatment was carried out in a hot water bath at 40° C.

Example 7

<Phosphoric Acid Group Introduction Step (Second Time)>
The <Phosphorylation reaction step> and <Washing and alkali treatment step> were carried out in the same manner as that of Example 1 to obtain a pulp comprising phosphorylated cellulose fibers B1. Using the obtained pulp comprising phosphorylated cellulose fibers B1 as a raw material, the aforementioned <Phosphorylation reaction step> was carried out thereon again, and phosphoric acid groups were further introduced into the cellulose in the resulting cellulose fibers, so as to obtain a pulp comprising phosphorylated cellulose fibers B2.

<Washing and Alkali Treatment Step (Second Time)>
The aforementioned <Washing and alkali treatment step> was carried out on the obtained pulp comprising phosphorylated cellulose fibers B2 to obtain a pulp comprising phosphorylated cellulose fibers B3.

<Bleaching and Alkali Treatment Step> and <Mechanical Treatment>
The <Bleaching and alkali treatment step> and <Mechanical treatment> were carried out in the same manner as that of Example 1, with the exception that, in the <Bleaching and alkali treatment step> of Example 1, 10 mL of sodium hypochlorite having an effective chlorine concentration of 53.8 g/L was added, so that the effective chlorine concentration in the suspension became 1097 ppm, and the bleaching treatment time was set at 15 minutes, thereby obtaining a pulp comprising bleached phosphorylated cellulose fibers C, and an ultrafine cellulose fiber-containing slurry.

Example 8

<Phosphorylation Reaction Step> and <Washing and Alkali Treatment Step>
The <Phosphorylation reaction step> and <Washing and alkali treatment step> were carried out in the same manner as that of Example 1 to obtain a pulp comprising phosphorylated cellulose fibers B.

<Bleaching and Alkali Treatment Step>
Ion exchange water was poured onto the obtained pulp comprising phosphorylated cellulose fibers B, so that the concentration of the pulp comprising phosphorylated cellulose fibers became 2% by mass, and the obtained mixture was homogeneously stirred to obtain 447 g of a suspension. To the suspension, 52.8 mL of chlorine dioxide having an effective chlorine concentration of 5.1 g/L was added, so that the effective chlorine concentration in the suspension became 549 ppm, and then, the obtained mixture was fully kneaded, so that chlorine dioxide was fully dispersed in the suspension. Thereafter, a bleaching treatment was initiated in a hot water bath at 70° C. It is to be noted that the additive amount of chlorine dioxide was 2.7% by mass with respect to the mass of the phosphorylated cellulose fibers. After the bleaching treatment had been performed for 5 minutes, 0.1 N sodium thiosulfate was added to the suspension in an amount sufficient for neutralizing chlorine dioxide, so that the effective chlorine remaining in the suspension was neutralized and the bleaching treatment was thereby terminated. By repeating the operation of performing filtration and dehydration on the bleached suspension to obtain a dehydrated sheet, remaining ions such as redundant sodium thiosulfate were fully washed away. Subsequently, the resultant was diluted with ion exchange water, so that the concentration of the pulp comprising phosphorylated cellulose fibers became 2% by mass, and while stirring, a 1 N sodium hydroxide aqueous solution was gradually added to the solution to obtain a slurry with pH 12±0.2. Thereafter, this slurry was dehydrated to obtain a dehydrated sheet, and ion exchange water was poured on the sheet again, followed by stirring for uniform dispersion. Then, the resulting solution was subjected to filtration and dehydration to obtain a dehydrated sheet. By repeating this operation of obtaining a dehydrated sheet, redundant sodium hydroxide was fully washed away, so as to obtain a pulp comprising bleached phosphorylated cellulose fibers C.

Example 9

<Phosphorylation Reaction Step> and <Washing and Alkali Treatment Step>

The <Phosphorylation reaction step> and <Washing and alkali treatment step> were carried out in the same manner as that of Example 1 to obtain a pulp comprising phosphorylated cellulose fibers B.

<Bleaching and Alkali Treatment Step>

Ion exchange water was poured onto the obtained pulp comprising phosphorylated cellulose fibers B, so that the concentration of the pulp comprising phosphorylated cellulose fibers became 2% by mass, and the obtained mixture was homogeneously stirred to obtain 499 g of a suspension. To the suspension, 1.5 g of thiourea dioxide (FAS) was added, so that the addition percentage of thiourea dioxide (FAS) became 15% by mass with respect to the mass of the pulp comprising phosphorylated cellulose fibers in the suspension, and thereafter, a bleaching treatment was initiated while stirring in a hot water bath at 80° C. After the bleaching treatment had been performed for 15 minutes, the operation of performing filtration and dehydration on the bleached suspension to obtain a dehydrated sheet was repeatedly carried out, so that remaining ions such as redundant sodium thiosulfate were fully washed away. Subsequently, the resultant was diluted with ion exchange water, so that the concentration of the pulp comprising phosphorylated cellulose fibers became 2% by mass, and while stirring, a 1 N sodium hydroxide aqueous solution was gradually added to the solution to obtain a slurry with pH 12±0.2. Thereafter, this slurry was dehydrated to obtain a dehydrated sheet, and ion exchange water was poured on the sheet again, followed by stirring for uniform dispersion. Then, the resulting solution was subjected to filtration and dehydration to obtain a dehydrated sheet. By repeating this operation of obtaining a dehydrated sheet, redundant sodium hydroxide was fully washed away, so as to obtain a pulp comprising bleached phosphorylated cellulose fibers C.

Comparative Example 1

A pulp comprising phosphorylated cellulose fibers B and an ultrafine cellulose fiber-containing slurry were obtained in the same manner as that of Example 1, with the exception that the <Bleaching and alkali treatment step> was not carried out in Example 1.

Comparative Example 2

A pulp comprising phosphorylated cellulose fibers B and an ultrafine cellulose fiber-containing slurry were obtained in the same manner as that of Example 7, with the exception that the <Bleaching and alkali treatment step> was not carried out in Example 7.

(Analysis and Evaluation)

<Measurement of ISO Whiteness and b* Value of Pulp Comprising Phosphorylated Cellulose Fibers>

Ion exchange water was added to the pulp comprising bleached phosphorylated cellulose fibers obtained in the aforementioned Examples, or the pulp comprising phosphorylated cellulose fibers obtained in the aforementioned Comparative Examples, so as to prepare a suspension, in which the concentration of the pulp comprising phosphorylated cellulose fibers was 0.3% by mass, and the obtained mixture was then stirred to obtain a fully homogeneous suspension. This suspension was filtered using Separato, so that a wet sheet having an absolute dry basis weight of 200 g/m$^2$ was formed on a filter paper (manufactured by Advantec Toyo Kaisha, Ltd., φ90 mm). The wet sheet was peeled off from the filter paper, was then placed on a stainless steel tray, and was then dried under conditions of 23° C. and a relative humidity of 50% for 3 days. Both surfaces of the dried sheet were sandwiched by papers and metal plates, and thereafter, using mini-hot press (manufactured by Toyo Seiki Kogyo Co., Ltd., MP-SNH), the sheet was pressed by a pressure of 7.7 MPa for 1 minute, to obtain a pulp sheet. It is to be noted that four pulp sheets were produced in each of the Examples and Comparative Examples. The four pulp sheets were laminated on one another, and using a whiteness spectrophotometer (manufactured by Suga Test Instruments Co., Ltd., SC-10WN), ISO whiteness (in accordance with JIS P 8148) and b* value (in accordance with JIS P 8150) were measured.

TABLE 1

| | | | | Bleaching treatment conditions | | | Phosphorylated cellulose fiber-containing sheet | |
| --- | --- | --- | --- | --- | --- | --- | --- | --- |
| | Number of phosphorylations | Drug | Pulp concentration [mass %] | Drug-adding rate [mass %] | Effective chlorine concentration [ppm] | Bleaching treatment temperature [° C.] | Bleaching treatment time [min] | ISO whiteness [%] | b* |
| Ex. 1 | Once | Sodium hypochlorite | 2 | 2.7 | 549 | 25 | 5 | 84.92 | 3.56 |
| Ex. 2 | Once | Sodium hypochlorite | 2 | 0.5 | 110 | 25 | 5 | 83.63 | 4.48 |
| Ex. 3 | Once | Sodium hypochlorite | 2 | 5.4 | 1097 | 25 | 5 | 86.34 | 2.84 |
| Ex. 4 | Once | Sodium hypochlorite | 2 | 2.7 | 549 | 25 | 1 | 84.79 | 3.70 |
| Ex. 5 | Once | Sodium hypochlorite | 2 | 2.7 | 549 | 25 | 15 | 85.69 | 3.07 |
| Ex. 6 | Once | Sodium hypochlorite | 2 | 0.5 | 110 | 40 | 5 | 84.42 | 3.98 |
| Ex. 7 | Twice | Sodium hypochlorite | 2 | 5.4 | 1097 | 25 | 15 | 85.25 | 2.92 |
| Ex. 8 | Once | Chlorine dioxide | 2 | 2.7 | 549 | 70 | 5 | 85.86 | 3.04 |
| Ex. 9 | Once | Thiourea dioxide | 2 | 15 | — | 80 | 15 | 83.14 | 4.59 |
| Comp. Ex. 1 | Once | — | 2 | — | — | — | — | 80.05 | 6.06 |
| Comp. Ex. 2 | Twice | — | 2 | — | — | — | — | 78.44 | 5.91 |

In Example 1, 4, 5 and 7, and Comparative Examples 1 and 2, the aforementioned <Mechanical treatment> was carried out to obtain ultrafine cellulose fibers. The obtained ultrafine cellulose fiber-containing slurry and ultrafine cellulose fibers were measured as follows.

<Measurement of Supernatant Yield>

The yield of a supernatant obtained after centrifugation of the ultrafine cellulose fiber-containing slurry was measured according to the following method. The supernatant yield obtained after centrifugation serves as an indicator of the yield of ultrafine cellulose fibers. The higher the supernatant yield, the higher the yield of ultrafine cellulose fibers that can be obtained.

Ion exchange water was added to the ultrafine cellulose fiber-containing slurry to obtain a slurry having a solid concentration of 0.1% by mass (Slurry A). The Slurry A was centrifuged using a cooled high-speed centrifugal separator (manufactured by KOKUSAN Co. Ltd., H-2000B) under conditions of 12000 G for 10 minutes. The obtained supernatant (referred to as "Slurry B") was recovered, and the solid concentration in the supernatant was then measured. After that, the supernatant yield (the yield of ultrafine cellulose fibers) was calculated according to the following equation:

Supernatant yield (%)=solid concentration (% by mass) in Slurry $B$/solid concentration (% by mass) in Slurry $A$×100.

<Measurement of Polymerization Degree>

The polymerization degree of the ultrafine cellulose fibers was calculated from the viscosity of a pulp measured in accordance with Tappi T230. Specifically, the ultrafine cellulose fibers as a measurement target were dispersed in a dispersion medium, the viscosity thereof was then measured (defined as $\eta 1$), and the blank viscosity was then measured using only the dispersion medium (defined as $\eta 0$). Thereafter, a specific viscosity ($\eta sp$) and an intrinsic viscosity ($[\eta]$) were calculated according to the following equations.

$\eta sp=(\eta 1/\eta 0)-1$ $[\eta]=\eta sp/(c(1+0.28\times\eta sp))$

In the above equation, c indicates the concentration of ultrafine cellulose fibers upon the measurement of the viscosity.

Further, the polymerization degree (DP) was calculated according to the following equation.

$DP=1.75\times[\eta]$

Since this polymerization degree is an average polymerization degree measured according to a viscosity method, it may also be referred to as a "viscosity average polymerization degree."

<Measurement of Viscosity>

For the measurement of the viscosity of the ultrafine cellulose fiber-containing slurry, the ultrafine cellulose fiber-containing slurry was diluted to a solid concentration of 0.4% by mass, and then, the resulting slurry was homogeneously stirred using a disperser at 1500 rpm. The obtained slurry was left at rest for 24 hours, and thereafter, the viscosity of the slurry was measured using a type B viscometer (manufactured by BROOKFIELD; analog viscometer T-LVT). Regarding measurement conditions, the viscosity obtained when the slurry was rotated at 25° C. at 3 rpm for 3 minutes was measured.

<Measurement of Haze>

Haze is a scale for the transparency of the ultrafine cellulose fiber-containing slurry. The lower the haze value, the higher the transparency of the slurry that can be obtained. For the measurement of a haze, the ultrafine cellulose fiber-containing slurry after completion of the mechanical treatment step (fibrillation step) is diluted with ion exchange water to result in a solid concentration of 0.2% by mass, and then, the resulting slurry is homogeneously stirred. The haze was measured using a hazemeter (manufactured by MURAKAMI COLOR RESEARCH LABORATORY Co., Ltd.; HM-150). The measurement was carried out using a glass cell for liquid having an optical path length of 1 cm (manufactured by Fujiwara Scientific Co., Ltd.; MG-40; inverse optical path) in accordance with JIS K 7136. The zero point was measured with ion exchange water which was placed in the glass cell.

<Measurement of Amount of Phosphoric Acid Groups Introduced>

The amount of phosphoric acid groups introduced was measured according to a conductometric titration method. Specifically, fibrillation was carried out by a mechanical treatment step (fibrillation step), and the obtained ultrafine cellulose fiber-containing slurry was then treated with an ion exchange resin. Thereafter, while adding a sodium hydroxide aqueous solution to the resulting slurry, a change in the electrical conductivity was obtained, and the amount of phosphoric acid groups introduced was thereby measured.

In the treatment with the ion exchange resin, a strongly acidic ion exchange resin (manufactured by Organo Corporation; Amberjet 1024; conditioned) was added at a volume ratio of 1/10 to a slurry containing 0.2% by mass of the ultrafine cellulose fibers, and the resultant mixture was stirred for 20 minutes. Then, the mixture was poured onto a mesh having 200-μm apertures to separate the resin from the slurry. In the alkali titration, a change in the electric conductivity value indicated by the dispersion was measured, while adding a 0.1 N aqueous solution of sodium hydroxide to the ultrafine cellulose fiber-containing slurry after the ion exchange.

This conductometric titration confers a curve shown in FIG. 1 as an alkali is added. First, the electrical conductivity is rapidly reduced (hereinafter, this region is referred to as a "first region"). Then, the conductivity starts rising slightly (hereinafter, this region is referred to as a "second region"). Then, the increment of the conductivity is increased (hereinafter, this region is referred to as a "third region"). The boundary point between the second region and the third region is defined as a point at which a change amount in the two differential values of conductivity, namely, an increase in the conductivity (inclination) becomes maximum. In short, three regions appear. Among them, the amount of the alkali required for the first region among these regions is equal to the amount of a strongly acidic group in the dispersion used in the titration, and the amount of the alkali required for the second region is equal to the amount of a weakly acidic group in the dispersion used in the titration. The amount (mmol) of the alkali required for the first region in the curve shown in FIG. 1 is divided by the solid content (g) in the dispersion as a titration target to obtain the amount (mmol/g) of the first dissociated alkali. The thus obtained amount is defined as the amount of phosphoric acid groups introduced.

<Measurement of Yellowness of Ultrafine Cellulose Fiber-Containing Sheet>

In order to evaluate the yellowness of the ultrafine cellulose fiber-containing slurry, the yellowness of the ultrafine cellulose fiber-containing sheet was evaluated. A predetermined amount of ultrafine cellulose fiber-containing slurry having a solid concentration of 0.5% by mass was fractionated, so that the absolute dry basis weight of a final sheet became 40 g/m$^2$, and it was then poured into Separoto holding a PVDF membrane filter having a pore diameter of 650 nm. Then, dehydration was carried out by performing suction filtration, so as to produce a wet sheet containing ultrafine cellulose fibers, in which the solid content of the ultrafine cellulose fibers was 4% by mass or more. The wet sheet containing ultrafine cellulose fibers was peeled off from the membrane filter, and was then placed on a polycarbonate plate. Thereafter, the wet sheet was subjected to drying under tension for 2 days in a humidity conditioning chamber at 23° C. and a relative humidity of 50%, so as to obtain an ultrafine cellulose fiber-containing sheet.

The yellowness (YI) of the ultrafine cellulose fiber-containing sheet was measured in accordance with JIS K 7373, using Colour Cute i (manufactured by Suga Test Instruments Co., Ltd.). Subsequently, the yellowness ($YI_{30}$) of the sheet relative to a film thickness of 30 μm was calculated according to the following conversion equation:

Yellowness ($YI_{30}$) of sheet relative to film thickness of 30 μm=yellowness (YI) of sheet×(30 (μm))/ (film thickness of sheet (μm))

Example 1 with Comparative Example 1, a difference between the amount of phosphoric acid groups in cellulose fibers before the bleaching step and the amount of phosphoric acid groups in cellulose fibers after the bleaching step could be calculated. The difference was found to be 0.04 mmol/g.

In addition, a difference between the viscosity average polymerization degree of ultrafine cellulose fibers obtained by fibrillation of a pulp comprising cellulose fibers before the bleaching step and the viscosity average polymerization degree of ultrafine cellulose fibers obtained by fibrillation of a pulp comprising cellulose fibers after the bleaching step was found to be 22.

Cellulose fibers before the bleaching step was subjected to a fibrillation treatment to obtain an ultrafine cellulose fiber-containing slurry 1 having a concentration of 0.4% by mass, and the viscosity of the slurry 1 was defined as P. Cellulose fibers after the bleaching step was subjected to a fibrillation treatment to obtain an ultrafine cellulose fiber-containing slurry 2 having a concentration of 0.4% by mass, and the viscosity of the slurry 2 was defined as Q. The P/Q value was found to be 1.0.

TABLE 2

| | Ultrafine cellulose fiber-containing slurry | | | | | |
|---|---|---|---|---|---|---|
| | Supernatant yield [%] | Viscosity average polymerization degree | Viscosity of 0.4 mass % slurry [mPa · s] | Haze of 0.2 mass % slurry [%] | Amount of phosphoric acid groups [mmol/g] | Ultrafine cellulose fiber-containing sheet Yellowness $YI_{30}$ |
| Ex. 1 | 98.6 | 862 | 14040 | 2.2 | 1.15 | 0.40 |
| Ex. 4 | 99.7 | 862 | 11400 | 2.8 | 1 14 | 0.42 |
| Ex. 5 | 100 | 854 | 13960 | 2.0 | 1.14 | 0.33 |
| Ex. 7 | 100 | — | — | 0.9 | 1.55 | — |
| Comp. Ex. 1 | 100 | 884 | 14000 | 2.1 | 1.19 | 0.59 |
| Comp. Ex. 2 | 99.2 | — | — | 1.4 | 1.60 | — |

The pulp comprising phosphorylated cellulose fibers obtained in each of the Examples had high ISO whiteness and a low b* value. Even in a case where such a pulp comprising phosphorylated cellulose fibers having high whiteness and a low b* value was fibrillated, the physical properties of a slurry comprising ultrafine cellulose fibers were maintained, and also, the yellowness of a sheet formed from the ultrafine cellulose fiber-containing slurry was suppressed at a low level.

Besides, in the above description, the pulp comprising cellulose fibers obtained in Comparative Example 1 corresponds to a pulp comprising cellulose fibers before being subjected to the bleaching step. As such, by comparing

The invention claimed is:

1. A sheet comprising phosphorylated ultrafine cellulose fibers, which have 0.5 mmol/g or more of phosphoric acid groups or phosphoric acid group-derived substituents and have a fiber width of 1000 nm or less, wherein $YI_{30}$ calculated according to the following Equation d is 0.57 or less, and the sheet is formed from a slurry with a haze of 10% or less:

Yellowness ($YI_{30}$) of sheet relative to film thickness of 30 μm=yellowness (YI) of sheet×(30 (μm))/ (film thickness of sheet (μm)), (Equation d)

wherein, in the above equation, the yellowness (YI) of a sheet is measured in accordance with JIS K 7373.

2. A laminate having the sheet according to claim 1 and a resin layer disposed on at least one surface of the sheet.

* * * * *